(12) United States Patent
Tran

(10) Patent No.: US 12,515,576 B1
(45) Date of Patent: Jan. 6, 2026

(54) TOWABLE TRAILER SYSTEM

(71) Applicant: Khoa Van Tran, San Antonio, TX (US)

(72) Inventor: Khoa Van Tran, San Antonio, TX (US)

( * ) Notice: Subject to any disclaimer, the term of this patent is extended or adjusted under 35 U.S.C. 154(b) by 387 days.

(21) Appl. No.: 18/337,308

(22) Filed: Jun. 19, 2023

Related U.S. Application Data

(60) Provisional application No. 63/353,349, filed on Jun. 17, 2022.

(51) Int. Cl.
| | |
|---|---|
| *B60P 3/00* | (2006.01) |
| *B60D 1/145* | (2006.01) |
| *B60P 1/12* | (2006.01) |
| *B60P 3/075* | (2006.01) |
| *B62D 21/20* | (2006.01) |

(52) U.S. Cl.
CPC .............. *B60P 3/075* (2013.01); *B60D 1/145* (2013.01); *B60P 1/12* (2013.01); *B62D 21/20* (2013.01)

(58) Field of Classification Search
CPC .. B60P 3/075; B60P 3/077; B60P 1/12; B60D 1/145; B60D 1/155; B60D 21/20
USPC .......................................................... 410/19
See application file for complete search history.

(56) References Cited

U.S. PATENT DOCUMENTS

| | | | |
|---|---|---|---|
| 2,835,400 A * | 5/1958 | Latzke .................. | B60P 3/1033 |
| | | | 280/43.11 |
| 3,400,944 A | 9/1968 | Narcisse | |
| 3,458,073 A | 7/1969 | Dawson | |
| 3,863,594 A | 2/1975 | Gawthrop | |
| D240,807 S | 8/1976 | Floodeen | |
| D243,597 S | 3/1977 | Headington | |
| 4,154,352 A | 5/1979 | Fowler | |
| D271,093 S | 10/1983 | Triggs | |
| D277,086 S | 1/1985 | Dudley | |

(Continued)

FOREIGN PATENT DOCUMENTS

| | | |
|---|---|---|
| KR | 100858866 B1 | 9/2008 |
| WO | 1999007595 A1 | 2/1999 |

OTHER PUBLICATIONS

Hand Trailer Winch, Owner's Manual and Safety Instructions, Haulmaster, Aug. 14, 2013.

(Continued)

*Primary Examiner* — Steven O Douglas
(74) *Attorney, Agent, or Firm* — Volk & McElroy, LLP; Michael D. Volk, Jr.

(57) ABSTRACT

A towable trailer includes a hitch assembly having a hitch coupler adapted to be removably engaged to a towing vehicle and a main body assembly for supporting and carrying a vehicle. The main body assembly has a central frame having a first frame structure, a second frame structure, and a third frame structure telescopically and removably coupled to each other. The towable trailer also includes a pair side frames removably coupled to the first frame structure and disposed on either side of the central frame. The towable trailer further includes a pair of wheel assemblies removably engaged to the pair of side frames. Each wheel assembly includes a coupling bar removably coupled to the wheel support tube, a wheel, a stub axle assembly connected to the wheel, and a raising and lowering mechanism adapted to selectively enable a pivoting of the stub axle assembly relative to the coupling bar.

20 Claims, 30 Drawing Sheets

(56) References Cited

U.S. PATENT DOCUMENTS

| | | |
|---|---|---|
| 4,752,177 A | 6/1988 | Zenna |
| 4,846,484 A | 7/1989 | Nekola |
| D307,732 S | 5/1990 | Level |
| D313,955 S | 1/1991 | Merwe et al. |
| D316,688 S | 5/1991 | Barginear |
| D322,235 S | 12/1991 | Bell |
| 5,161,814 A | 11/1992 | Walker |
| 5,267,746 A | 12/1993 | Stevenson |
| D375,921 S | 11/1996 | Kunkle |
| D384,010 S | 9/1997 | Chiu |
| D403,276 S | 12/1998 | Neault et al. |
| D434,701 S | 12/2000 | Patmont |
| D443,561 S | 6/2001 | Voogt |
| 6,378,904 B1 | 4/2002 | Niehoff |
| 6,428,035 B1 | 8/2002 | Maxwell et al. |
| D464,916 S | 10/2002 | Golenz et al. |
| 6,612,389 B1 | 9/2003 | Bell |
| 6,659,497 B1 | 12/2003 | Owens |
| 6,955,375 B2 | 10/2005 | Thurm |
| D528,497 S | 9/2006 | Ezra |
| D544,815 S | 6/2007 | Williams |
| 7,275,753 B1 | 10/2007 | Ceccarelli et al. |
| D566,624 S | 4/2008 | Dempsey et al. |
| 7,458,602 B2 | 12/2008 | Maxwell |
| 7,547,025 B2 | 6/2009 | Coates |
| 7,673,887 B2 | 3/2010 | Hassell |
| D626,461 S | 11/2010 | Barrios et al. |
| D626,891 S | 11/2010 | Smith |
| D644,602 S | 9/2011 | Dieguez et al. |
| 8,016,316 B1 | 9/2011 | Carlton |
| D648,656 S | 11/2011 | Crane |
| D664,072 S | 7/2012 | Halloran |
| D664,476 S | 7/2012 | Fraley et al. |
| D698,699 S | 2/2014 | Dempsey et al. |
| 8,657,305 B1 | 2/2014 | Hassell |
| D706,684 S | 6/2014 | Dempsey et al. |
| D710,262 S | 8/2014 | Faye |
| 8,876,140 B2 | 11/2014 | Barnett |
| 9,010,784 B2 | 4/2015 | Rezania |
| D737,725 S | 9/2015 | Bell |
| 9,321,388 B2 * | 4/2016 | Barnett .................. B60P 3/122 |
| D759,546 S | 6/2016 | Wyk |
| D759,547 S | 6/2016 | Wyk |
| D763,532 S | 8/2016 | Huang |
| 10,005,504 B2 | 6/2018 | Tran |
| D920,847 S | 6/2021 | Gibson |
| D969,029 S | 11/2022 | Neufeld et al. |
| 12,240,549 B1 * | 3/2025 | Tran ...................... B62D 63/08 |
| 2004/0004333 A1 | 1/2004 | Riermann |
| 2004/0262882 A1 | 12/2004 | Huddleston |
| 2007/0235985 A1 | 10/2007 | Thompson |
| 2011/0038699 A1 | 2/2011 | Nguyen |
| 2015/0016930 A1 | 1/2015 | Barnett |
| 2018/0265143 A1 | 9/2018 | Tran |

OTHER PUBLICATIONS

Stinger Trailer, Motorcycletrailer.com, Internet publication, Aug. 9, 2015, available at https://web.archive.org/web/20150709044158/http://www.motorcycletrailer.com/nav/carry1.html.

* cited by examiner

TOWABLE TRAILER SYSTEM

CROSS-REFERENCE TO RELATED
APPLICATIONS

This application claims the benefit of U.S. Provisional Patent Application No. 63/353,349, filed Jun. 17, 2022, titled TOWABLE TRAILER SYSTEM.

DETAILED DESCRIPTION

Figure 1:
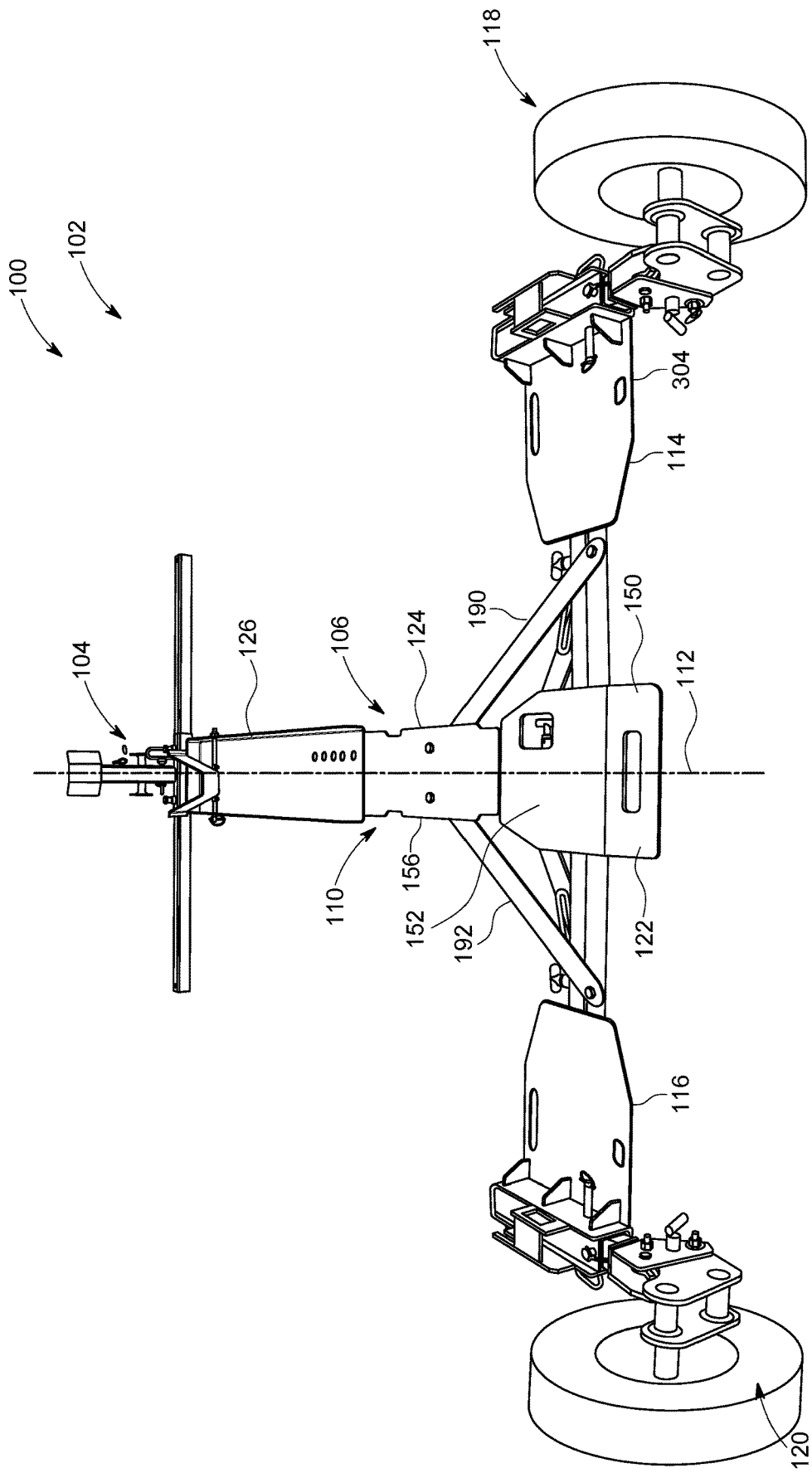
FIG. 1 shows a rear top perspective view of a towable trailer of a towable trailer system of the present disclosure.
Figure 2:
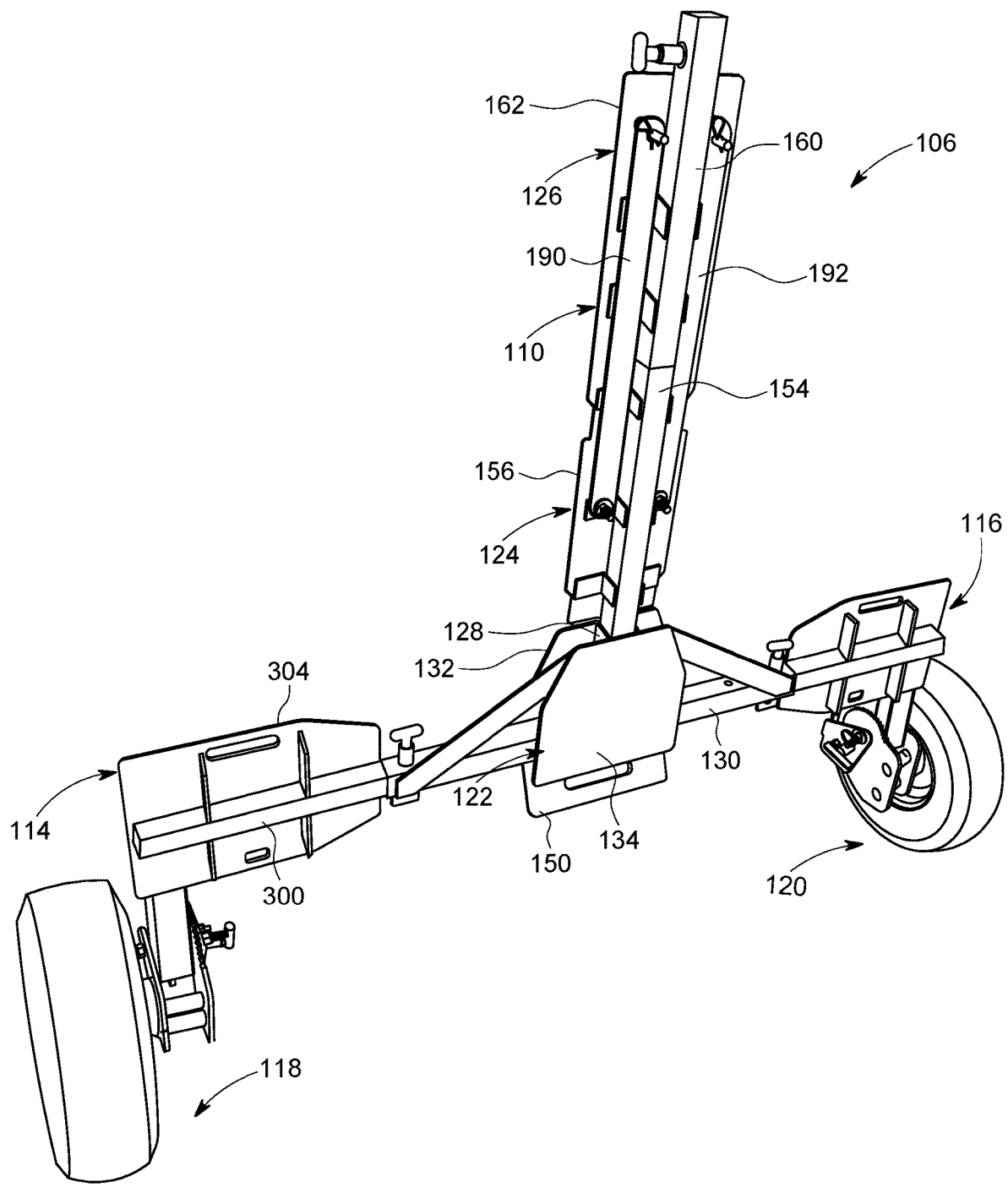
FIG. 2 shows bottom perspective view of a main body assembly of the towable trailer of FIG. 1.

The present disclosure pertains to a towable trailer system. More particularly, the present disclosure pertains to a towable trailer system having a trailer, for a motorcycle or trike (or similar vehicle), adapted to be removably attached to a towing vehicle (a car, truck, and the like).

Example implementations are described below with reference to the accompanying drawings. Unless otherwise expressly stated in the drawings, the sizes, positions, etc., of components, features, elements, etc., as well as any distances therebetween, are not necessarily to scale, and may be disproportionate and/or exaggerated for clarity.

Like numbers refer to like elements throughout. Thus, the same or similar numbers may be described with reference to other drawings even if they are neither mentioned nor described in the corresponding drawing. Also, elements that are not denoted by reference numbers may be described with reference to other drawings.

Many different forms and implementations are possible without deviating from the spirit and teachings of this disclosure and so this disclosure should not be construed as limited to the example implementations set forth herein. Rather, these example implementations are provided so that this disclosure will be thorough and complete, and will convey the scope of the disclosure to those skilled in the art.

Reference in this specification to "one implementation" or "an implementation" means that a particular feature, structure, or characteristic described in connection with the implementation is included in at least one implementation of the present disclosure. The appearance of the phrase "in one implementation", or similar phrases, in various places in this specification are not necessarily all referring to the same implementation, nor are separate or alternative implementations mutually exclusive of other implementations.

FIG. 1 shows a top perspective view of a towable trailer 100 of a towable trailer system 102 of the present disclosure adapted to be towed behind a towing vehicle and the towable trailer 100 supporting a two-wheeler (motorcycle) or a three-wheeler (trike). Examples of a towing vehicle may include a car, a truck, an all-terrain vehicle, a golf cart, or similar vehicle. The towed vehicle (motorcycle, trike, etc.) is not shown in the drawings.

A feature of towable trailer 100 is to provide an improved transport apparatus for the towing of vehicle or cargo, such apparatus capable of being quickly and easily disassembled for compact storage or travel when not in use. To achieve this objective, towable trailer 100 comprises a plurality of easily connectable components that, when joined, form an operable trailer 100 and that when disconnected can be compactly stowed or transported. The connectable components of trailer 100 are configured to allow a single person to disassemble and reassemble trailer 100, as needed.

In defining the general organizational makeup of the apparatus, trailer 100 can be described as having two principal portions identified herein as a hitch-connection assembly 104 and a main body assembly 106. The hitch-connection assembly 104 and the main body assembly 106 may be separated, as needed, for compact storage or transport, as shown.

In the present disclosure, the hitch-connection assembly 104 (hereinafter referred to as hitch assembly 104) includes a hitch coupler 108 (shown in FIG. 9), forming a hitch attachment point between trailer 100 and the towing vehicle (not shown). Main body assembly 106 is formed from multiple demountable subcomponents, as shown. These include frame members, wheel assemblies, accessory electrical components, and an arrangement of crossbars, and longitudinal bars, which will be described further herein.

The main body assembly 106 is formed from a set of demountable subcomponents, which may be compactly arranged for storage or travel. In the depicted implementation, subcomponents of main body assembly 106 include a central frame 110 extending along a central longitudinal axis 112 of the towable trailer 100, a first side frame 114 arranged at a rear end of the central frame 110 and extending substantially perpendicularly to the central frame 110 in a first direction, a second side frame 116 arranged at the rear end of the central frame 110 and extending substantially perpendicularly to the central frame 110 in a second direction opposite to the first direction, a first wheel assembly 118 removably coupled to first side frame 114 and a second wheel assembly 120 removably coupled to the second side frame 116. The first side frame 114 and the second side frame 116 are also removably coupled to the central frame 110. First side frame 114 and second side frame 116 are similar in construction, assembly, and function, and are arranged symmetrically about the central longitudinal axis 112 of the towable trailer 100, as shown. Similarly, first wheel assembly 118 and second wheel assembly 120 are similar in construction, assembly, and function, and are arranged symmetrically about central longitudinal axis 112 of the towable trailer 100. For the sake of clarity and brevity, structures, construction, assemblies, and functions of the first side frame 114 and the first wheel assembly 118 are below explained in detail.

Referring to FIGS. 1 to 4, the central frame 110 includes a first frame structure 122, a second frame structure 124 removably and telescopically coupled to the first frame structure 122, and a third frame structure 126 removably and telescopically coupled to the second frame structure 124. The second frame structure 124 and the third frame structure are disposed substantially centrally to trailer 100 and extend along the central longitudinal axis 112 of trailer 100. First side frame 114 and second side frame 116 are removably coupled to first frame structure 122 and extend in a lateral direction relative to central longitudinal axis 112.

Figure 3:
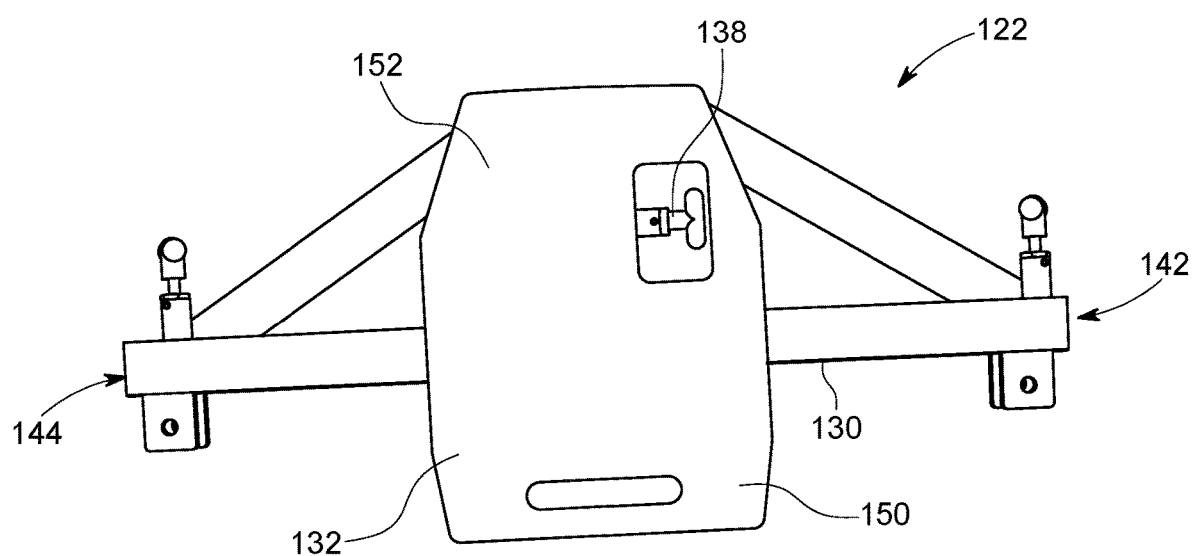
FIG. 3 shows a top view of a first frame structure of the main body assembly of FIG. 2.
Figure 4:
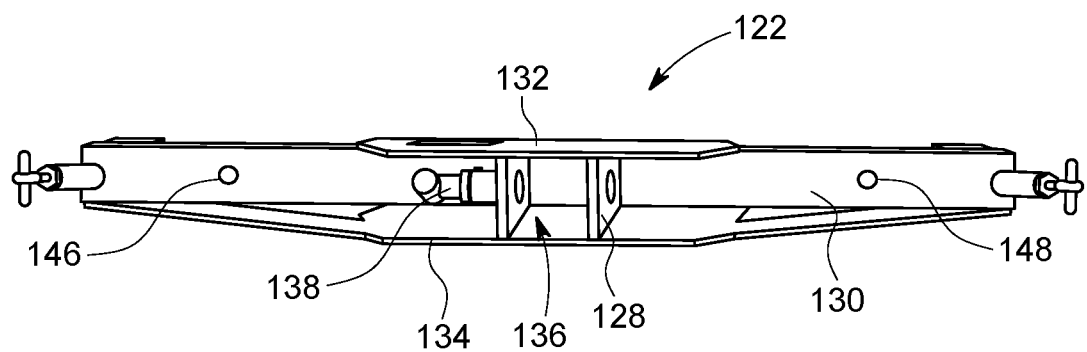
FIG. 4 shows a front perspective of the first frame structure of main body assembly.

As shown in FIGS. 3 and 4, the first frame structure 122 includes a first elongate member 128 (see FIG. 4) extending along the central longitudinal axis 112 (see FIG. 1), a first cross member 130 arranged substantially perpendicularly to the first elongate member 128, a first plate 132 (i.e., top plate 132) and a second plate 134 (i.e., bottom plate 134). The first elongate member 128 is a tubular member having an opening 136 at a front end to enable the telescopic engagement of the second frame structure 124 with the first frame structure 122. In the present disclosure, the first elongated member 128 comprises a generally square cross-sectional shape, however, other cross-sectional shape may also be possible. Further, the first elongated member 128 may include a set of aligned apertures to secure the connection of first elongate member 130 with the second frame structure 124 with at least one locking pin 138. As shown, the first elongate member 128 is coupled to the first cross member 130 at a mid-point of the first cross member 130.

Accordingly, the first cross member 130 extends laterally on both sides of the first elongated member 128. In an implementation, instead of single cross member, the first frame structure 122 may include two cross members extending laterally and in opposite direction from the first elongate member 128. As with the first elongate member 128, the first cross member 130 is a tubular member having a generally square cross-sectional shape with a first opening 142 arranged at a first side of the central frame 110, and a second opening 144 arranged at a second side of the central frame 110. Although the first cross-member 130 having the square cross-sectional shape is shown and contemplated it may be appreciated that the first cross-member 130 may include any other cross-sectional shapes. First opening 142 facilitates a telescopic connection of the first side frame 114 with the first frame structure 122, while the second opening 144 enables a telescopic connection of the second side frame 116 with the first frame structure 122. Moreover, the first cross member 130 may include at least one first aperture 146 arranged proximate to the first opening 142 to secure the connection of first cross member 130 with the first side frame 114 via at least one locking pin. Similarly, first cross member 130 includes at least one second aperture 148 arranged proximate to second opening 144 to secure the connection of first cross member 130 with second side frame 116 via at least one locking pin.

Bottom plate 134 is arranged and coupled to the bottom sides of first elongate member 128 and first cross member 130, while the top plate 132 is arranged and coupled to the top sides of the first elongate member 128 and the first cross member 130. Accordingly, the first elongate member 128 and a portion of the first cross member 130 are arranged between the top plate 132 and the bottom plate 134. Moreover, a first side portion and a second side portion of the first cross member 130 extend outwardly of the bottom plate 134 and the top plate 132 on a first side and a second side of the central frame 110, respectively. Also, top plate 132 includes an angled portion 150 (best shown in FIG. 1 and FIG. 3) arranged rearwardly of the first cross member 130 and extending downwardly from a flat portion 152 of the top plate 132. The angled portion 150 acts as a ramp to enable a mounting of the vehicle (e.g., a motorcycle or trike) on the trailer 100 when trailer 100 is lowered.

Figure 5:
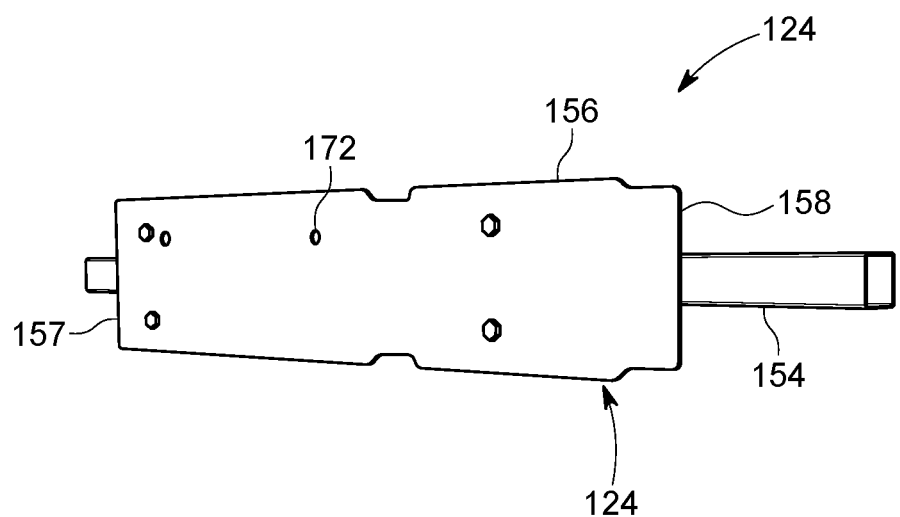
FIG. 5 shows a top perspective view of a second frame structure of the main body assembly.

As shown in FIG. 5, the second frame structure 124 includes a second elongate member 154 extending along the central longitudinal axis 112 and a support plate 156 arranged/coupled on a top side of the second elongate member 154. Accordingly, the second elongate member 154 is arranged underneath the support plate 156 and supports the support plate 156. Further, a length of the second elongate member 154 is greater than a length of the support plate 156. Accordingly, a first portion (i.e., front portion) of the second elongate member 154 extends outwardly of a first end 157 (i.e., front end 157) of the support plate 156 and a second portion (i.e., a rear portion) of the second elongate member 154 extends rearwardly and outwardly of a second end 158 (i.e., rear end 158) of the support plate 156. The second portion of the second elongate member 154 is adapted to engage with the first elongate member 128 of the first frame structure 122 to enable the telescopic engagement of the second frame structure 124 with the first frame structure 122. Further, the first elongate member 128 and the rear portion of the second elongate member includes an array of aligned apertures to enable removable engagement of the first elongate member 128 and the second elongate member 154 via at least one lock pin. The front portion of the second elongate member 154 is telescopically coupled with the third frame structure 126. As with the first elongate member 128, the second elongate member 154 is a tubular member having a generally square cross-sectional shape, however, it may be appreciated that the second elongate member 154 may include another cross-sectional shape. Also, the second frame structure 124 may include a pair of diagonal braces 190, 192 (see FIG. 1) extending from underneath the support plate 156 to the side frames 114, 116.

Figure 6:
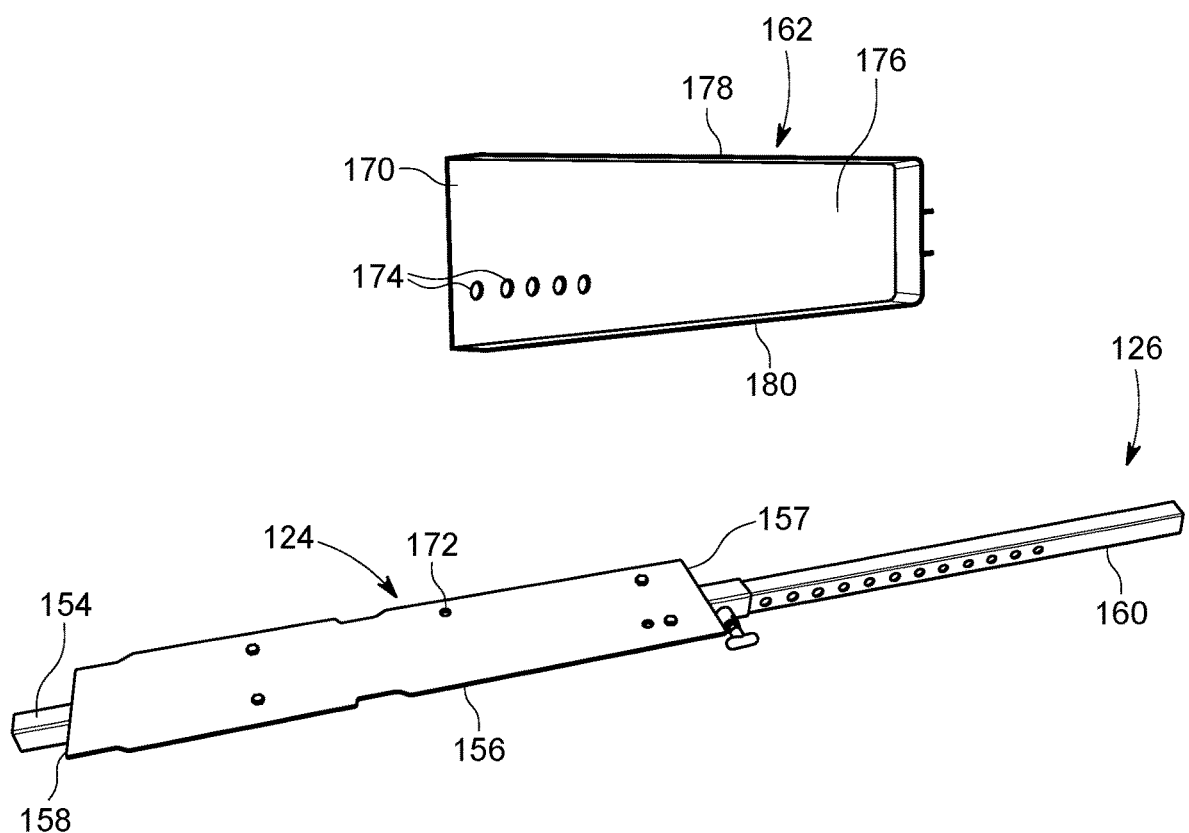
FIG. 6 shows a top perspective view of a third frame structure of the main body assembly assembled with the second frame structure and a tray of the third frame structure disengaged from a third elongate member of the third frame structure.
Figure 7:
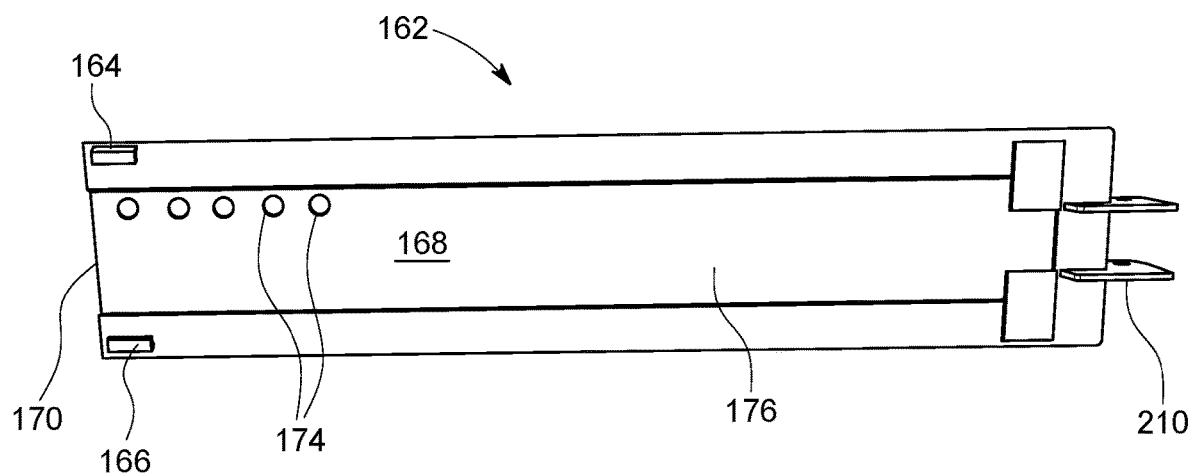
FIG. 7 shows bottom view the tray of FIG. 6.
Figure 8:
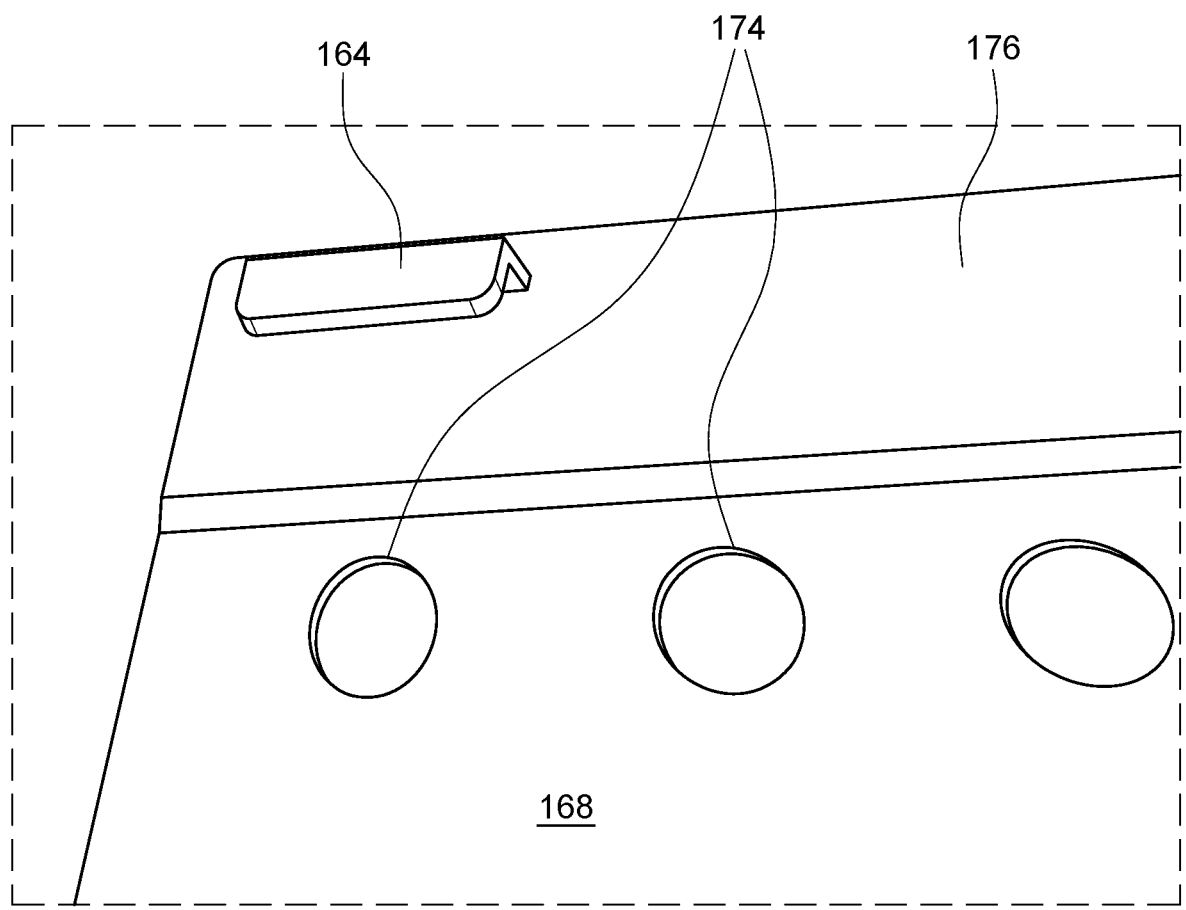
FIG. 8 shows a portion of a bottom of the tray of FIG. 7.

As shown in FIG. 6, third frame structure 126 includes a third elongate member 160 extending along central longitudinal axis 112 and a tray 162 arranged/coupled on a top side of the third elongate member 160. Third elongate member 160 is arranged underneath tray 162 and supports tray 162. A rear portion of third elongate member 160 is adapted to engage with the front portion of second elongate member 154 to enable the telescopic engagement of the third frame structure 126 with second frame structure 124. Further, third elongate member 160 includes an array of holes to enable removable engagement of the second elongate member 154 and third elongate member 160 via at least one lock pin. Referring to FIG. 7 and FIG. 8, tray 162 includes a pair of brackets 164, 166 (L-shaped brackets) coupled to a bottom surface 168 of tray 162 and arranged proximate to a rear end 170 of tray 162. Brackets 164, 166 are arranged opposite to each other, and the longitudinal edges of support plate 156 may extend through the brackets 164, 166 in the assembly of the second frame structure 124 and third frame structure 126, and thereby brackets 164, 166 facilitate sliding of tray 162 relative to support plate 156 in response to the telescopic movement of third frame structure 126 relative to second frame structure 124. In the assembly of third frame structure 126 with second frame structure 124, tray 162 is attached to support plate 156 by extending one or more fasteners through at least one hole 174 of tray 162 and at least one hole 172 of the support plate 156.

Figure 9:
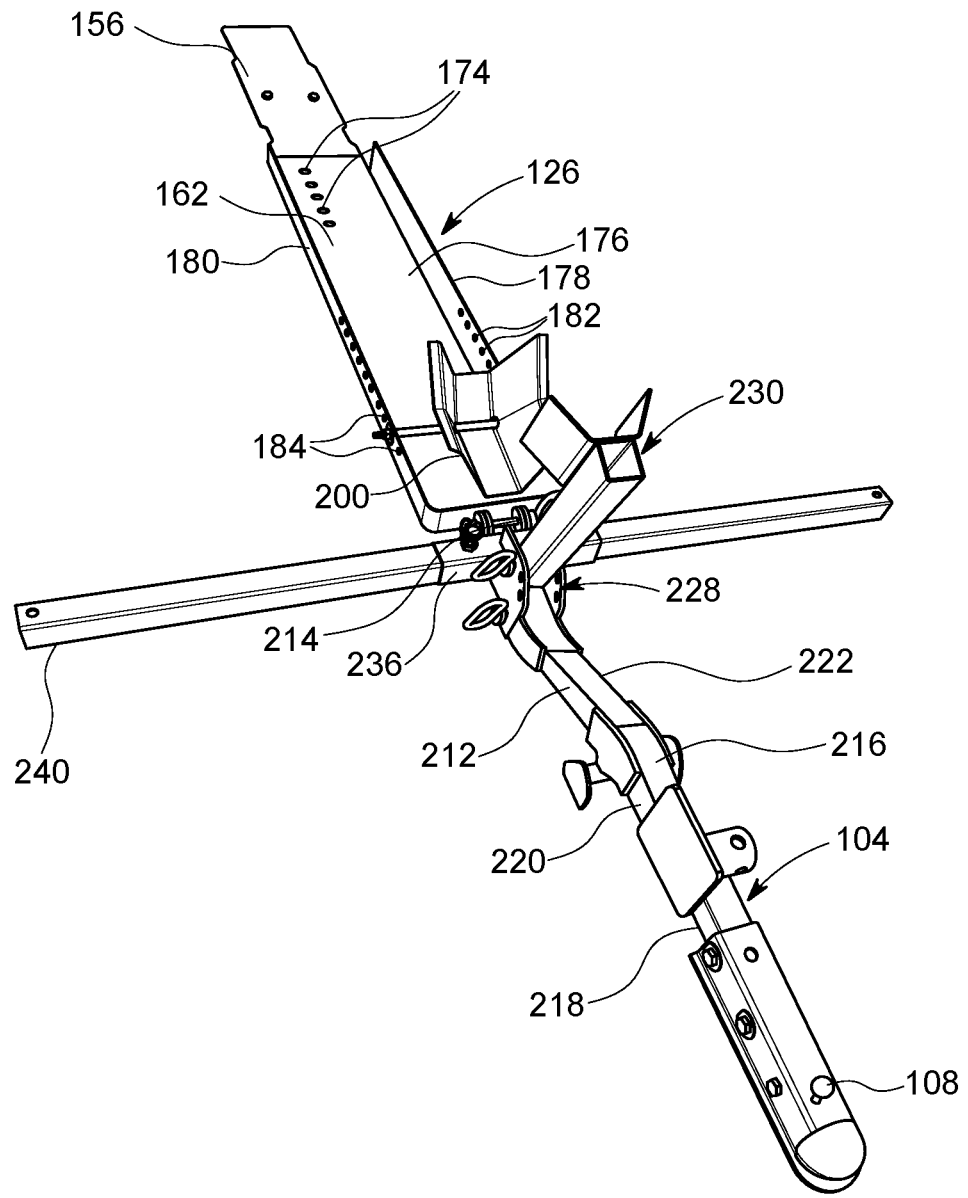
FIG. 9 shows top perspective view of a hitch assembly connected to the third frame structure of the main body assembly.

Referring to FIG. 6 and FIG. 9, tray 162 includes a base plate 176 and a pair of opposingly disposed side plates 178, 180 extending upwardly from the base plate 176. A first side plate 178 includes a plurality of first holes 182 (shown in FIG. 9) arrayed linearly from a front end of the tray 162 towards a rear end of the tray 162. Similarly, a second side plate 180 includes a plurality of second holes 184 (shown in FIG. 9) arrayed linearly from the front end of the tray 162 towards the rear end of the tray 162. The first holes 182 are aligned with the second holes 184. The holes 182, 184 enable an attachment of a first wheel support structure 200 with the tray 162 (i.e., the third frame structure 126).

Figure 10:
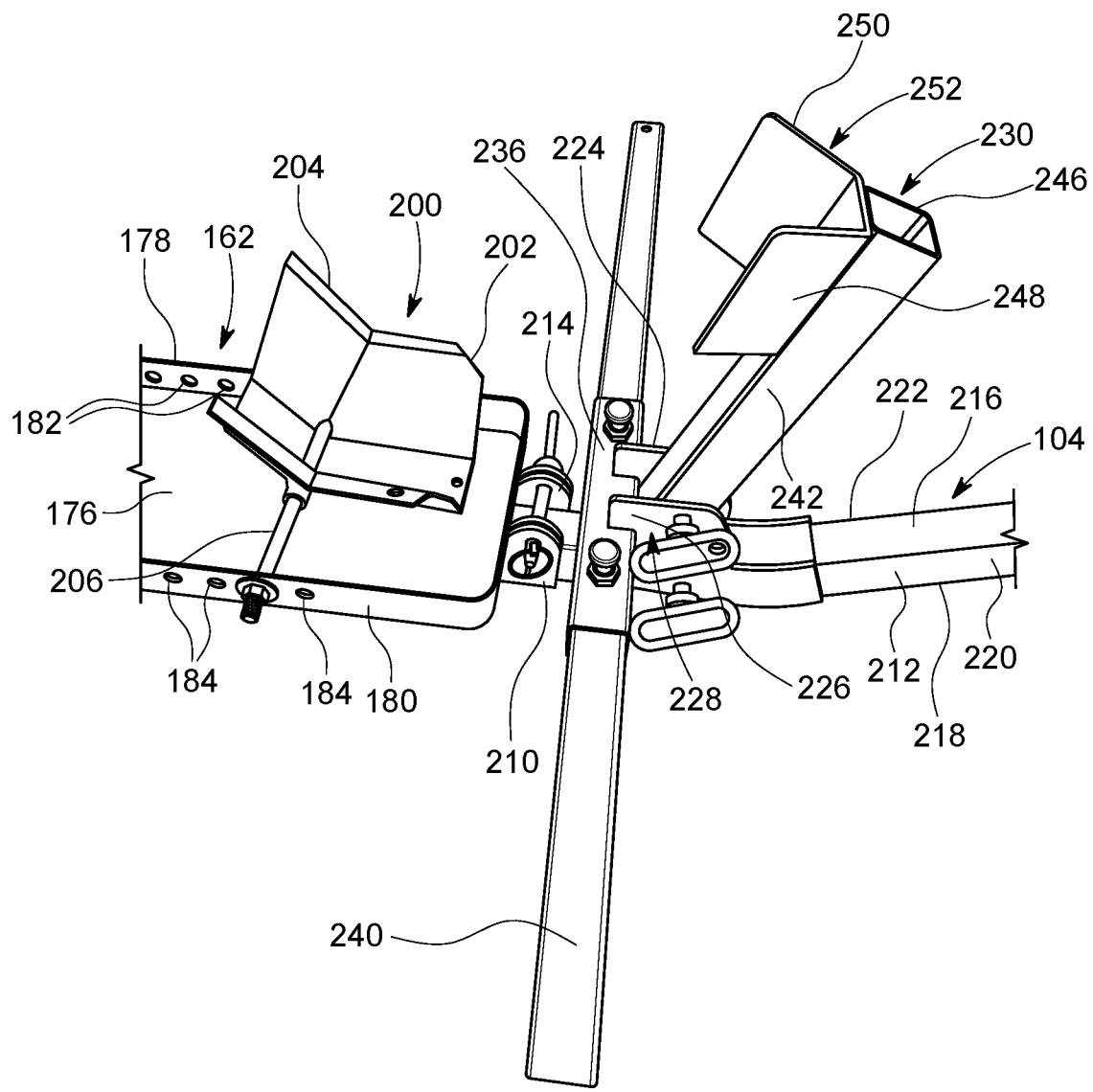
FIG. 10 shows side perspective view of a portion of the hitch assembly and the third frame structure connected to each other.
Figure 11:
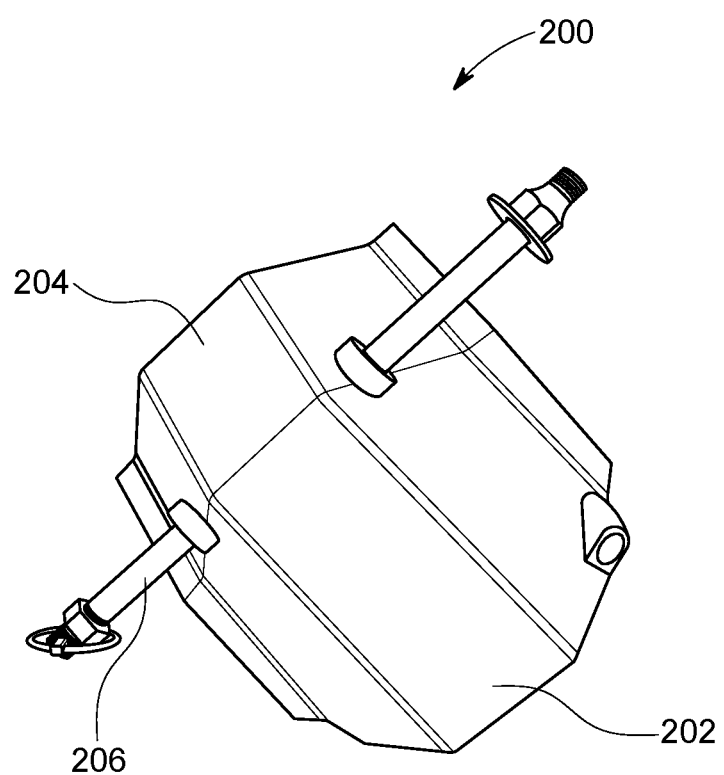
FIG. 11 shows a bottom perspective view of a first wheel support structure of the main body assembly.

As shown in FIGS. 10 and 11, first wheel support structure 200 includes a first U-shaped support structure 202 and a second U-shaped support structure 204 extending at an obtuse angle relative to the first U-shaped support structure 202. To enable attachment of first wheel support structure 200 with tray 162, first wheel support structure 200 includes a fastener 206 (for example, a stud) that extends through aligned first hole 182 and the second hole 184 of the tray 162. As shown, fastener 206 extends laterally through the first wheel support structure 200 and is shown to be arranged at an interface of the first U-shaped support structure 202 and the second U-shaped support structure 204. Further, in an assembly of the first wheel support structure 200 with the tray 162, the first wheel support structure 200 is arranged inside the tray 162 such that the first U-shaped structure 202 extends along the base plate 176 of the tray 162 and the second U-shaped support structure 204 extends vertically and upwardly relative to the base plate 176 of the tray 162. Moreover, end portions of the fastener 206 extend outside tray 162 in the lateral direction and are engaged with the tray 162 by engaging nuts at two end portions of the fastener 206 (stud). Further, two locking pins may be engaged at the two end portions of the fastener 206 (stud) to prevent the disengagement of the two nuts from the end portions of the fastener 206 (stud). The first wheel support structure 200 is adapted to abut the vehicle supported on the towable trailer 100 and prevents movement of the vehicle in a rearward direction relative to the towable trailer 100.

The third frame structure 126 includes a first bracket 210 (best shown in FIG. 7 and FIG. 10) arranged at a front end of the third frame structure 126 and coupled to the third elongate member 160 or the tray 162. The first bracket 210 enables a removable coupling of the main body assembly 106 (i.e., the third frame structure 126) with the hitch assembly 104.

Figure 12:
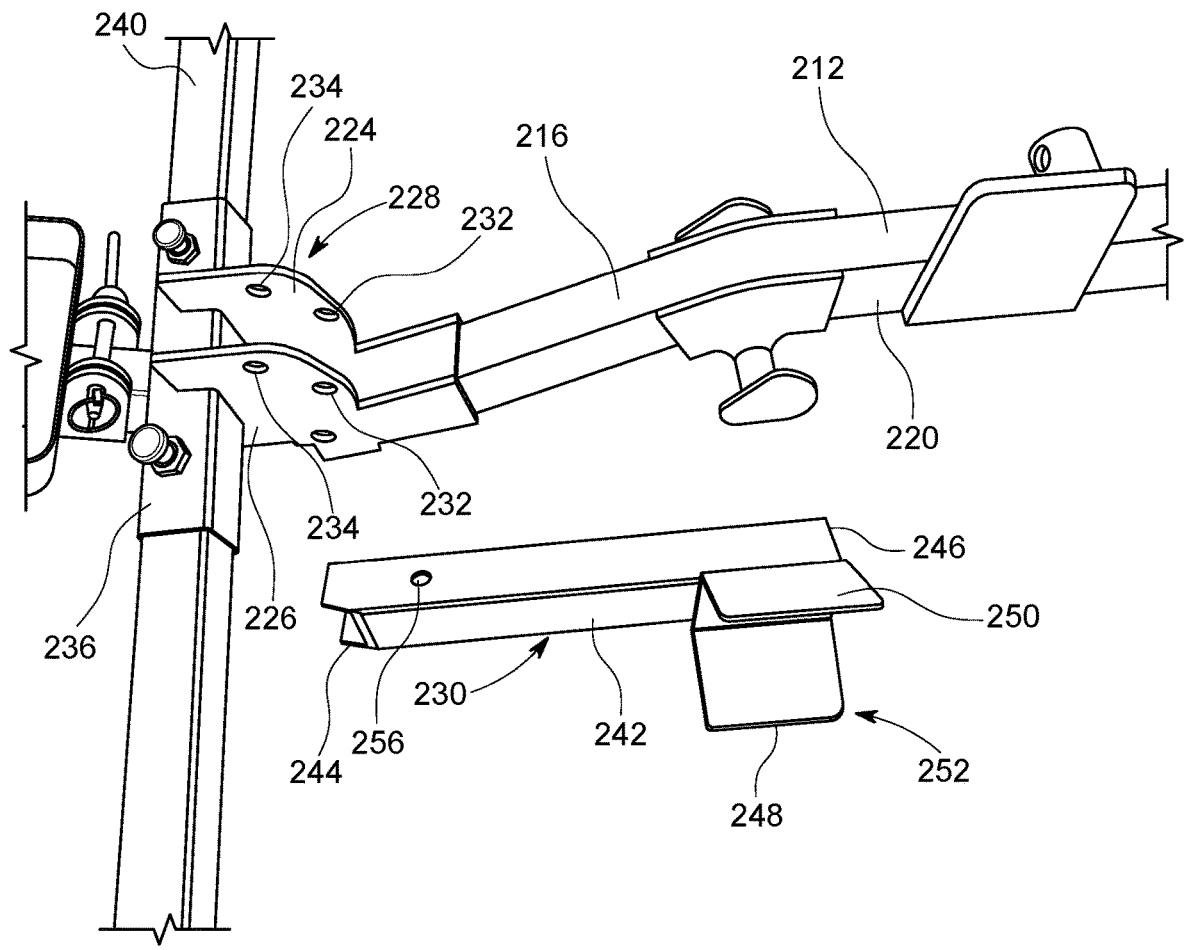
FIG. 12 shows a portion of the hitch assembly with a second wheel support structure disengaged from an attachment bracket of the hitch assembly.

As shown in FIGS. 9, 10, and 12, the hitch assembly 104 include a fourth elongate member 212 having the hitch coupler 108 at one end and a connection member 214 at the opposing end. In an implementation, the connection member 214 is a U-shaped bracket adapted to be removably engaged with the first bracket 210 of the third frame structure 126 via a pin. In the present disclosure, the fourth elongate member 212 comprises a rigid tubular element that may be implemented as a rigid metallic tube. The fourth elongate member 212 is implemented with an upper surface 216 and a bottom surface 218 connected by a first side surface 220 and a second side surface 222, the cross-section of which is generally square shaped. Other cross-section shapes may suffice. Fourth elongate member 212 comprises a set of bends, as shown, allowing the hitch coupler 108 to be elevated relative to the opposing connection member 214 when hitch coupler 108 is properly installed on the towing vehicle. When towable trailer 100 is assembled, the fourth elongate member 212 is generally aligned with longitudinal axis 112, as shown.

Hitch coupler 108 can be implemented in many ways. In FIG. 9, hitch coupler 108 is configured to engage with a conventional trailer hitch ball of the towing vehicle. A variety of ball-type couplers are well known in the art to connect a towing vehicle to the trailer 100. Commercially available units often include a ball-receiving housing arranged to receive trailer hitch ball and to retain the ball within the housing using a manually operated latching element. A hitch coupler 108 of this type, suitable for use in the present system, comprises a Fulton® brand straight tongue coupler produced by Horizon Global Corporation of Plymouth, Michigan. Other coupler assemblies may suffice. Apertures are provided within elongate member to enable securing of hitch coupler 108 using bolts, hitch-coupler pins, or similar mechanical fasteners. In an alternate implementation, hitch coupler 108 can be permanently affixed to elongate member by welding. In some implementations, other hitch assemblies, non-standard hitch assemblies or other coupling arrangement matching the connection point of the towing vehicle may suffice.

Referring to FIGS. 10 and 12, hitch assembly 104 includes a pair of vertically extending plates 224, 226 defining an attachment bracket 228 that enables a coupling of a second wheel support structure 230 to the hitch assembly 104. The plates 224, 226 are engaged with the fourth elongate member 212 and are disposed spaced apart from each other. Further, each of the plates 224, 226 includes a pair of apertures 232, 234 to enable the coupling of the second wheel support structure 230 with the attachment bracket 228. As shown, the attachment bracket 228 is arranged proximate to the connection member 214. Further, the hitch assembly 104 may include a cross-rod 236 extending substantially perpendicularly to the fourth elongate member 212. In an implementation, the cross-rod 236 may be arranged between the connection member 214 and the attachment bracket 228. As shown, the cross-rod 236 is a tube having a substantially square cross section and is supported on the fourth elongate member 212. Although the tube having the square cross-section is contemplated as the cross-rod 236, it may be appreciated that the cross-rod 236 may include any other suitable cross-section. The towable trailer 100 may further include a laterally extending member 240 that extends through the cross-rod 236 and extends in the direction of extension of the cross-rod 236. The laterally extending member 240 is secured with the cross-rod 236 via two locking pins. The laterally extending member 240 may include holes or brackets at each end to facilitate an engagement of straps to the vehicle supported on the towable trailer 100.

Referring to FIGS. 10 and 12, the second wheel support structure 230 includes a rod 242 having a first end 244 (i.e., bottom end) and a second end 246 (i.e., top end) and a pair of plates 248, 250 coupled to the rod 242 and arranged proximate to the top end 246 and spaced apart from each other. The pair of plates 248, 250 together defines a support bracket 252 to receive a wheel of the vehicle arranged on the towable trailer 100, and also acts as a stopper to prevent the vehicle supported on the trailer 100 from moving in the forward direction. To enable an engagement of the rod 242 with the attachment bracket 228, the rod includes a hole 256 disposed proximate to the bottom end 244 of the rod and extending through the rod 242. In an assembly of the second wheel support structure 230 with the hitch assembly 104, the hole 256 of the rod 242 align with one of the holes 232, 234 of the attachment bracket 228, and a lock pin extends through the aligned holes of the rod 242 and the attachment bracket 228. Also, in the assembly, the rod 242 extends substantially vertically from the fourth elongate member 212 and the pair of plates 248, 250 of the second wheel support structure 230 extends in the direction of the longitudinal axis 112 and in a rear ward direction from the rod 242. As shown, the rod 242 may extend upwardly and obliquely in a forward direction from the fourth elongate member 212 in the assembly.

Figure 13:
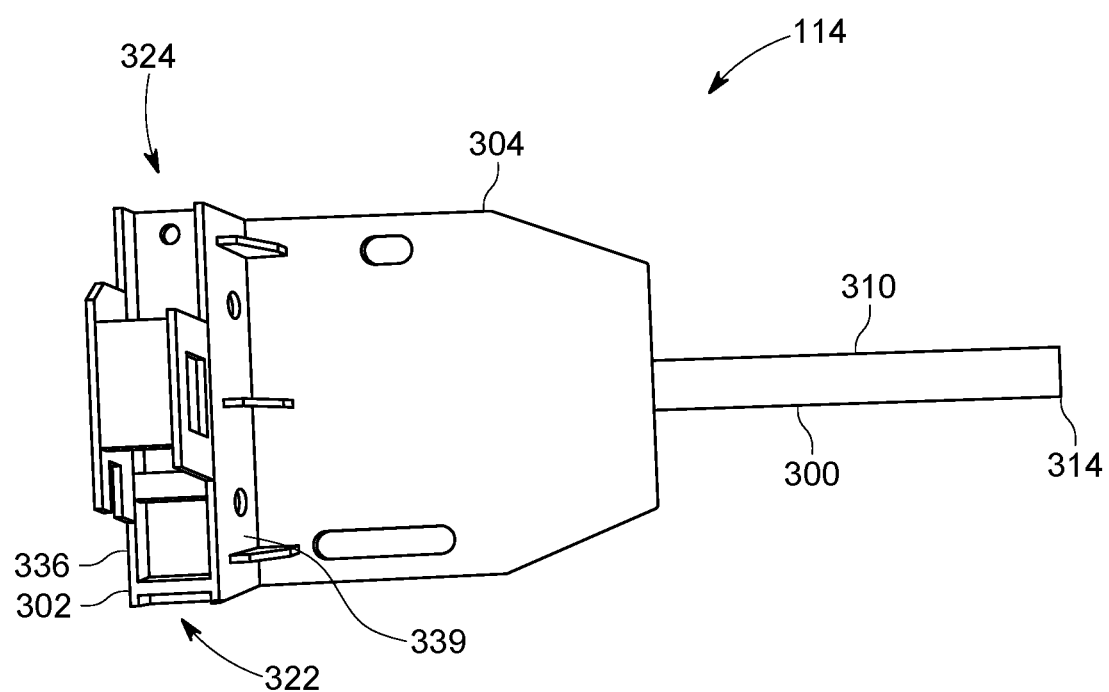
FIG. 13 shows a top perspective view of a first side frame of the main body assembly of FIG. 1.
Figure 14:
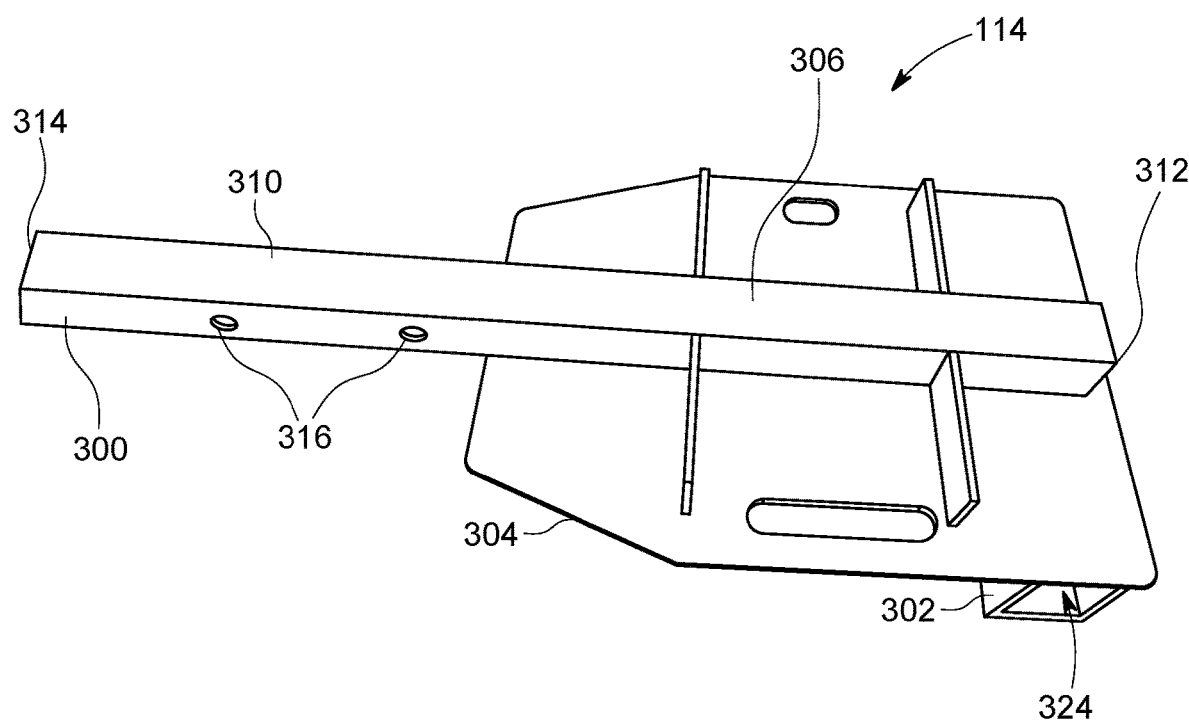
FIG. 14 shows a bottom perspective view of the first side frame of FIG. 13.

Referring to FIGS. 13 and 14, the first side frame 114 includes a crossbar 300, a wheel support tube 302 and a top plate 304 supported on the crossbar 300. The crossbar 300 is a hollow tube having a square cross-section having a first portion 306 arranged underneath the top plate 304 and a second portion 310 extending outwardly of the top plate 304. The first portion 306 extends from a first end 312 of the crossbar 300 to the second portion 310, while the second portion 310 extends from the first portion 306 to a second end 314 of the crossbar 300. The second portion 310 at least partially extends inside the first cross member 130 of the first frame structure 122 through the first opening 142 and engages with the first cross member 130 to enable the telescopic engagement of the first side frame 114 with the first frame structure 122. In an implementation, the second portion 310 may include a pair of holes 316 to enable the attachment of the crossbar 300 with the first cross member 130 via at least one locking pin. In an assembly, one of more of the holes 316 align with one or more apertures of the first cross member 130 and at least one locking pin extends through the aligned hole 316 and the aperture.

Wheel support tube 302 extends in a direction substantially parallel to the central longitudinal axis 112 and arranged at the first end 312 of the crossbar 300. The wheel support tube 302 is disposed above the top plate 304 and defines a first opening 322 arranged proximate to a front of the towable trailer 100 relative to a second opening 324. The crossbar 300, the wheel support tube 302, and the top plate 304 are fixedly engaged with each other, for example, the crossbar 300, the wheel support tube 302, and the top plate 304 are welded to each other.

Figure 15:
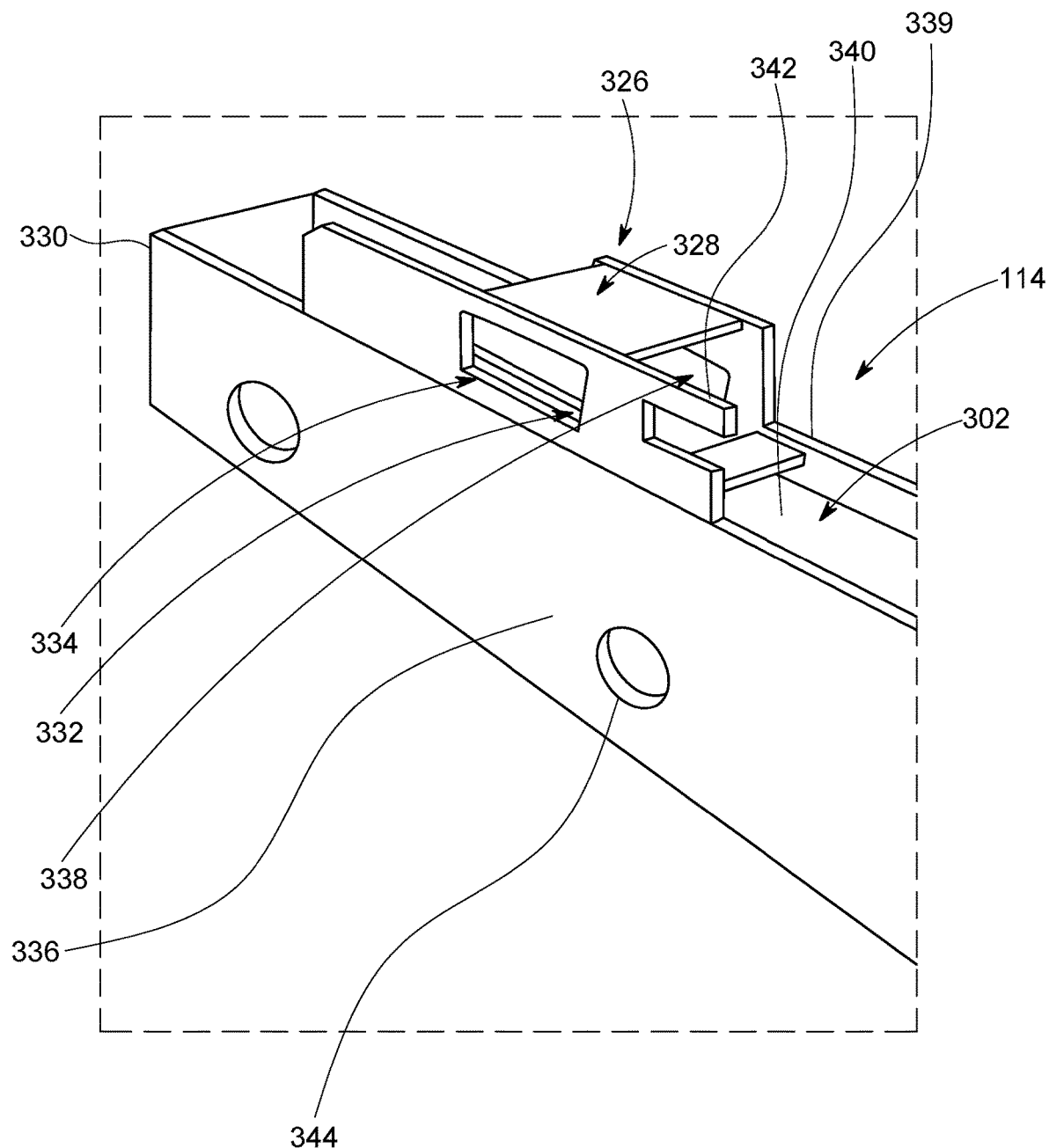
FIG. 15 shows an enlarged view of a portion of the first side frame depicting an engagement bracket of the first side frame.

Referring to FIG. 15, the first side frame 114 includes a retention structure 326, for example, an engagement bracket 328 attached to the wheel support tube 302 and arranged proximate to a rear end 330 of the wheel support tube 302. As shown, the engagement bracket 328 defines an elongated channel 332 extending laterally to the wheel support tube 302 and having a first opening 334 at a first side that is aligned with a first side surface 336 of the wheel support tube 302 and a second opening 338 at a second side that is aligned with a second side surface 339 of the wheel support tube 302 and arranged opposite to the first side surface 336 of the wheel support tube 302. As shown, the engagement bracket 328 extends upwardly from an upper surface 340 of the wheel support tube 302. Moreover, the first side frame 114 includes a hook 342 extending upwardly from the upper surface 340 of the wheel support tube 302 and arranged proximate to the first side surface 336 of the wheel support tube 302. Further, the wheel support tube 302 includes aligned apertures 344 extending through the first side surface 336 and the second side surface 339 to enable a coupling of the first wheel assembly 118 with the first side frame 114 via at least one locking pin.

Figure 16:
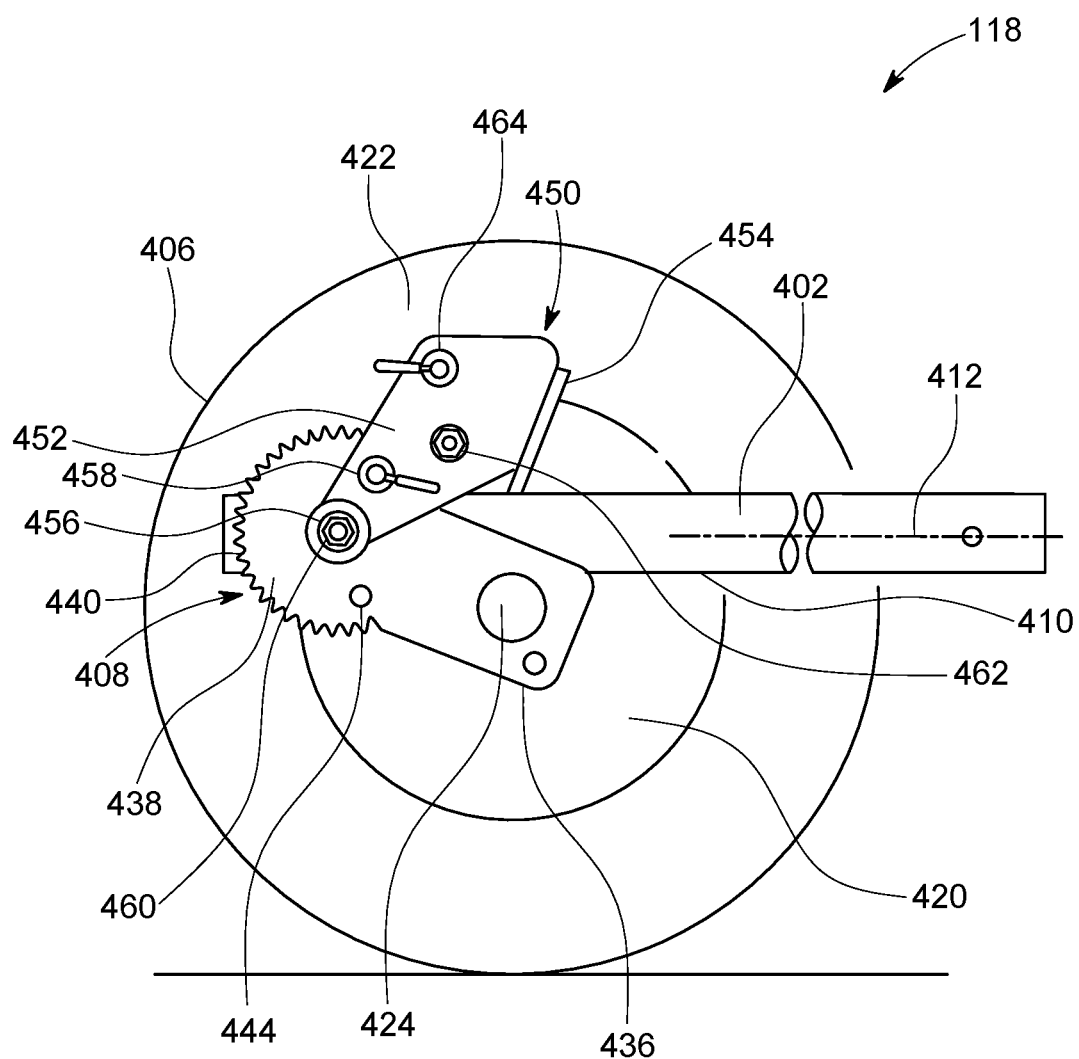
FIG. 16 shows a side view illustrating a first wheel assembly of the towable trailer of FIG. 1.
Figure 21:
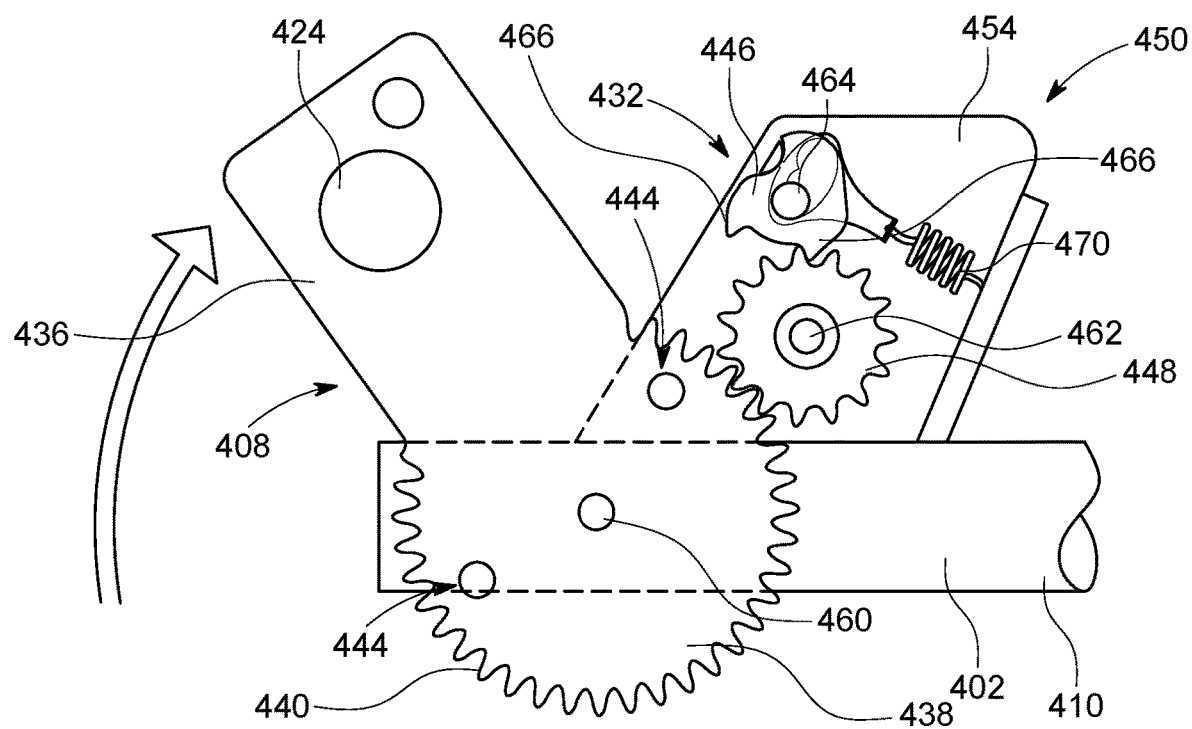
FIG. 21 is a sectional diagram illustrating the first wheel assembly of FIG. 16 adjusted to second of two height settings.
Figure 22:
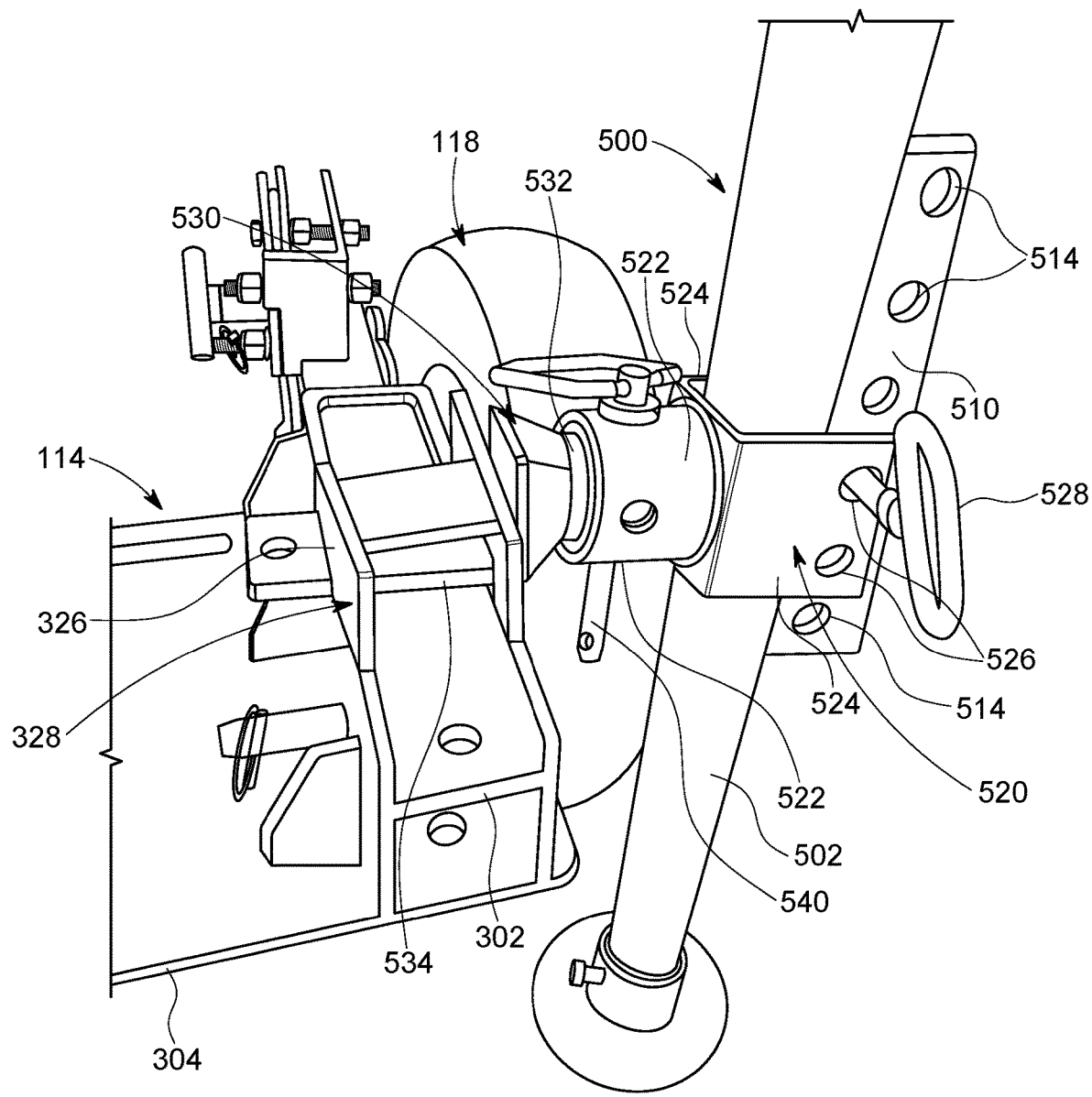
FIG. 22 shows a top perspective of a portion of the towable trailer depicting a jack assembly of the towable trailer system engaged with the first wheel assembly.
Figure 23:
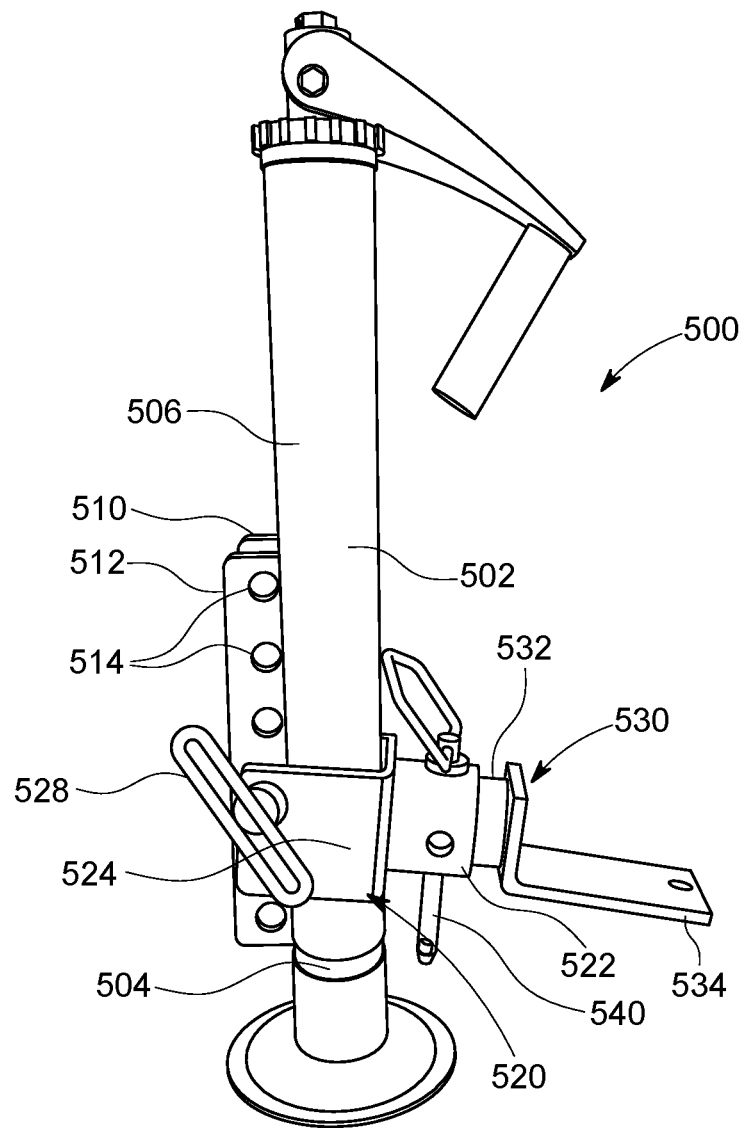
FIG. 23 shows side perspective of the jack assembly of FIG. 22.
Figure 24:
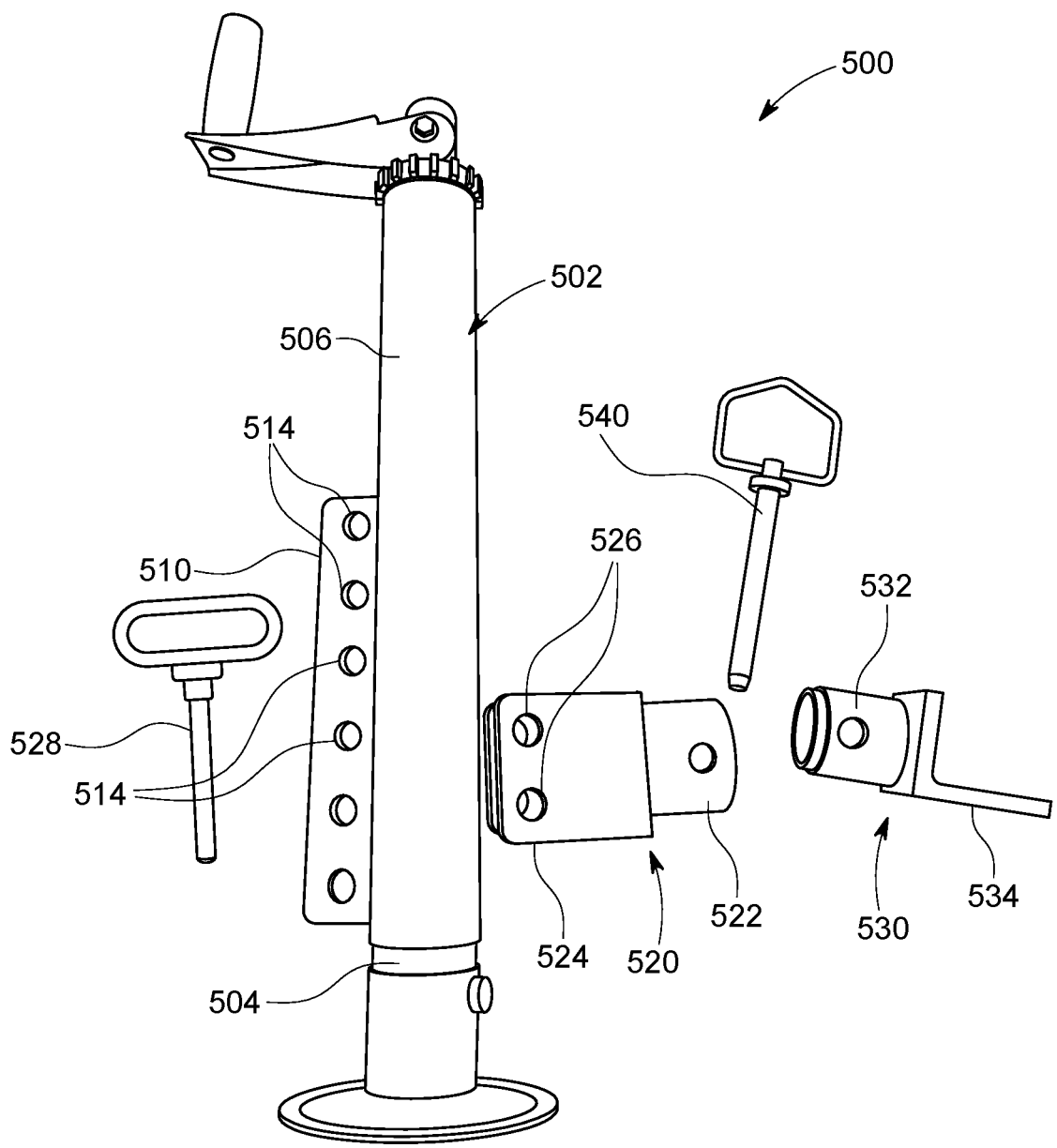
FIG. 24 shows an exploded view of the jack assembly of FIG. 23.
Figure 25:
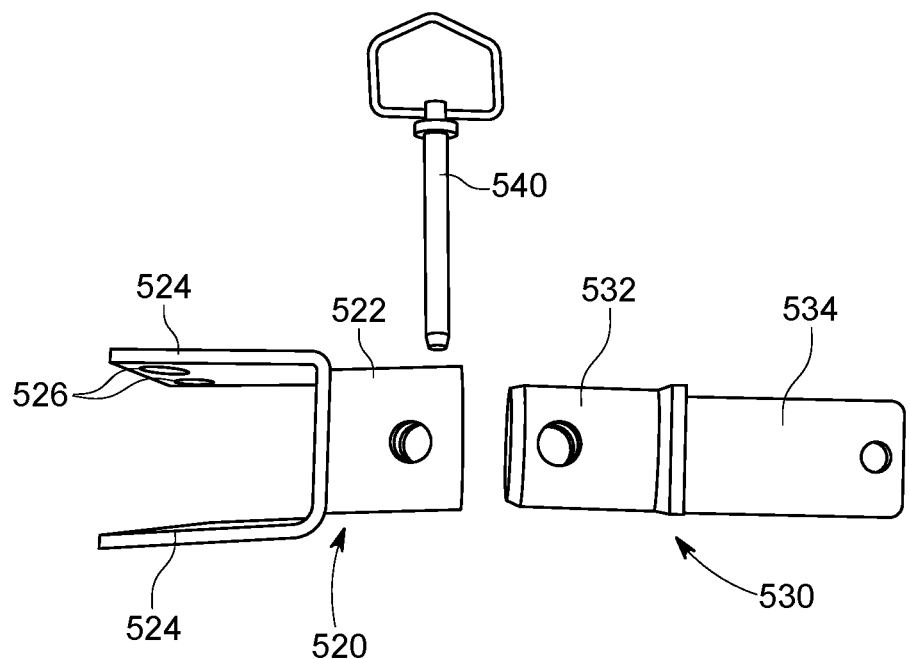
FIG. 25 shows a coupler disengaged from an engagement structure of the jack assembly of FIG. 23.
Figure 26:
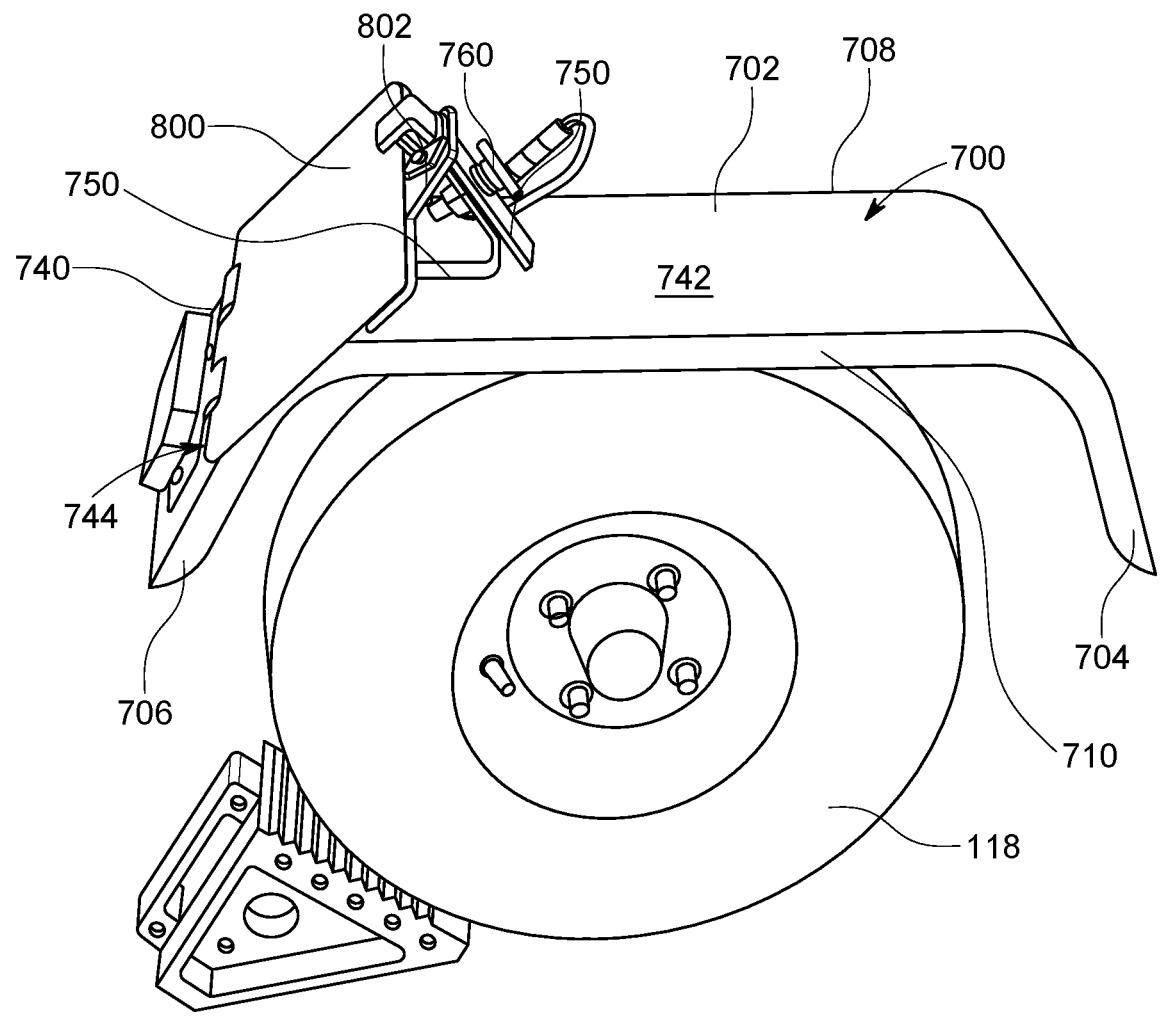
FIG. 26 shows a side perspective view of a wheel guard engaged with the first wheel assembly.
Figure 27:
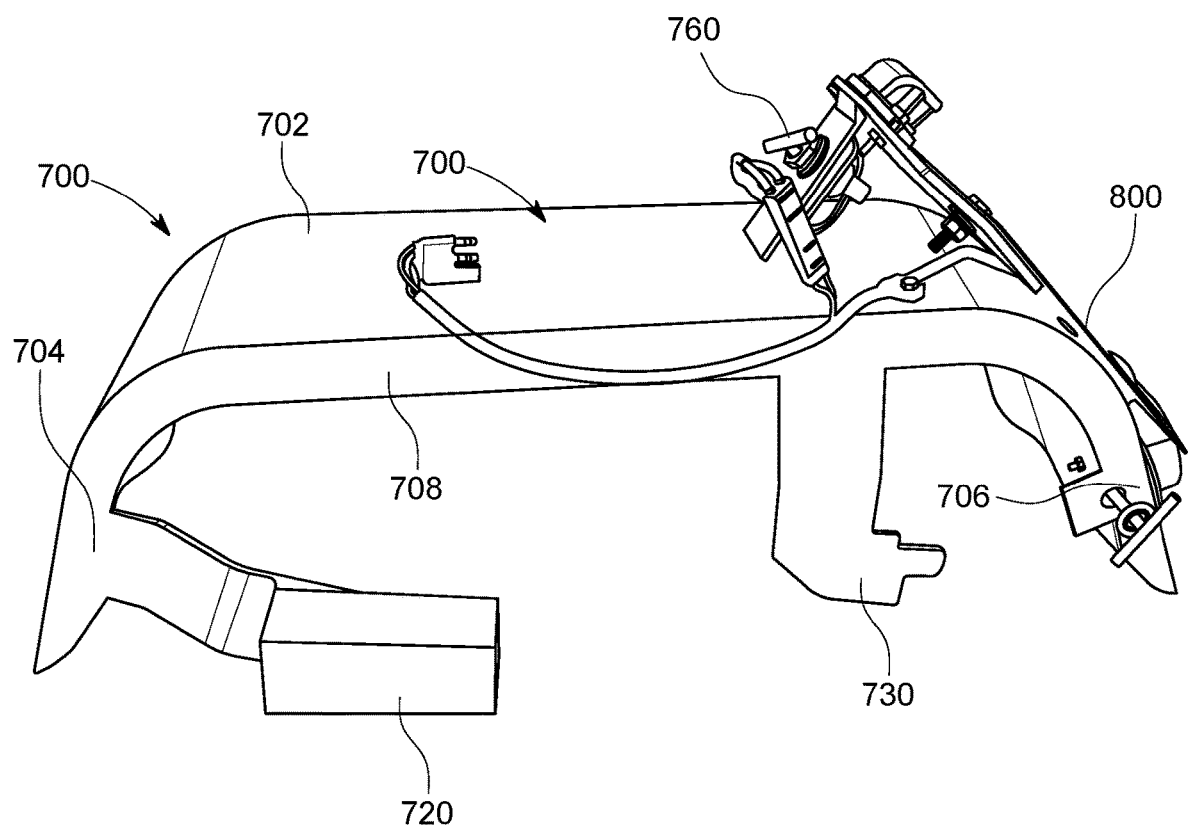
FIG. 27 shows a top perspective of the wheel guard of FIG. 26

FIG. 16 is a side view of the first wheel assembly 118 having a coupling bar 402 (a frame insertion member) and a stub axle assembly 404 (a wheel attachment member) to which a wheel 406 may be rotationally attached. Wheel 406 and the stub axle assembly 404 are shown joined to the coupling bar 402 by a raising and lowering mechanism 408. It is noted that the raising and lowering mechanism shown and described with reference to FIGS. 16-21 (wheel/lever mediated raising and lowering) are used when a motorcycle is being loaded onto trailer 100. The trailer 100 is lowered, the motorcycle is pushed or driven onto trailer, secured, and then trailer 100 is raised for travel. For heavier vehicles, such as trikes, the raising and lowering mechanism shown and described with reference to FIGS. 22-24 is used (i.e., jack-stand mediated raising and lowering). Further, for heavier vehicles, the raising and lowering mechanism shown and described with reference to FIGS. 22-24 are used in combination with the raising and lowering mechanism shown and described with reference to FIGS. 16-21.

Figure 17:
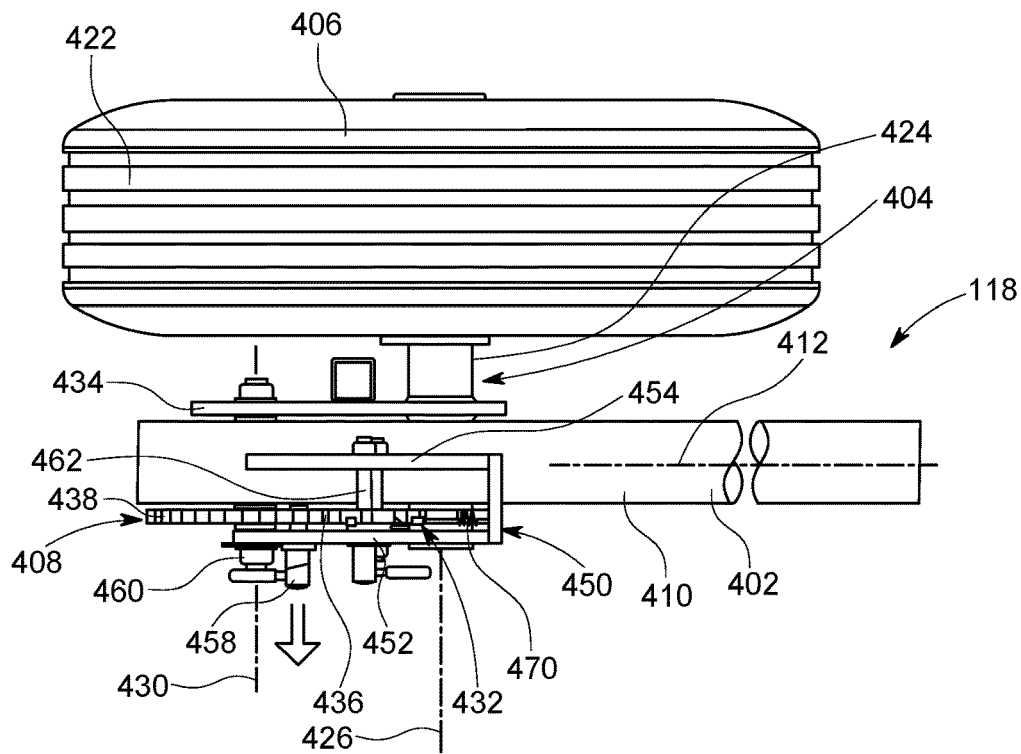
FIG. 17 is a top view of the first wheel assembly of FIG. 16.

Referring to FIGS. 16 and 17, the coupling bar 402 includes an elongated tubular element 410 adapted to extend inside the wheel support tube 302 to enable the engagement/coupling of the first wheel assembly 118 with the first side frame 114. According to one implementation, the tubular element 410 comprises a set of apertures that aligns with apertures 344 of the wheel support tube 302 and the at least one locking pin extends through the aperture of the tubular element 410 and the aperture 344 of the wheel support tube 302, coupling/securing the first wheel assembly 118 with the first side frame 114. When the two members are joined, longitudinal axis 412 of tubular element 410 is in a parallel orientation with central longitudinal axis 112. The coupling bar 402 is inserted inside the wheel support tube 302 through the first opening 322 of the wheel support tube 302.

Each wheel 406 comprises a central wheel rim 420 on which tire 422 may be mounted, as shown. According to one implementation of the present disclosure, tire 422 comprises a rubber-pneumatic trailer tire. Stub axle assembly 404 includes a spindle 424 that defines an axis of rotation 426, about which wheel 406 rotates. Such axis of rotation 426 can be aligned perpendicularly to both the longitudinal axis 412 of the tubular element 410 and central longitudinal axis 112, as shown.

Raising and lowering mechanism 408 may be structurally configured to join with the spindle 424 and the coupling bar 402 in an adjustable relationship. More specifically, raising and lowering mechanism 408 establishes a second axis of rotation 430 (shown in FIG. 17) about which spindle 424 and the associated axis of rotation 426 pivot in relation to coupling bar 402.

The raising and lowering mechanism 408 includes a reversible ratchet mechanism 432 (FIGS. 17, 20, and 21) to limit a rotational movement of the mechanism to a single direction during raising and lowering operations. The reverse-motion suppression provided by ratchet mechanism 432 increases user safety by holding the rotating assembly at the last rotational position.

Figure 18:
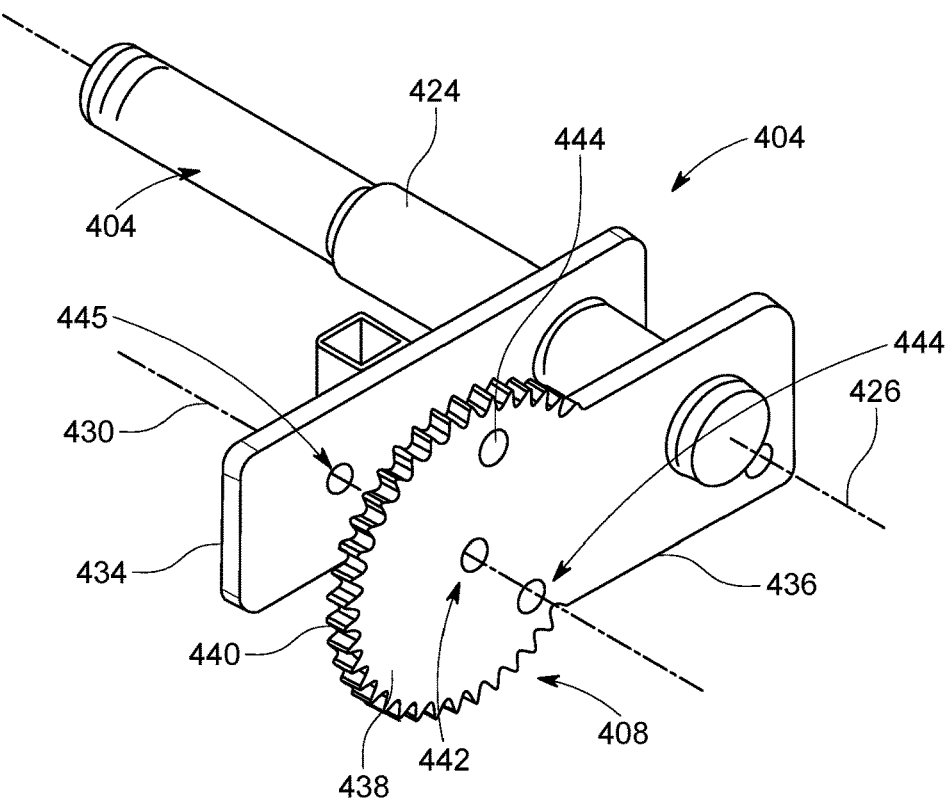
FIG. 18 is a perspective view illustrating a stub-axle assembly of the first wheel assembly of FIG. 16.

As shown in FIG. 17 and FIG. 18, stub axle assembly 404 includes a pair of parallel side plates, for example, a first plate 434 of the side-plates pair is connected to spindle 424, as shown. Second plate 436 is joined with first plate 434 by the spindle 424. Second plate 436 includes a gear plate portion 438 having an outer set of gear teeth 440, a centrally-positioned mounting aperture 442, and a pair of locking apertures 444 spaced equidistantly from centrally-positioned aperture 442, as shown. First plate 434 is provided with a mounting aperture 445 that can be aligned with centrally-positioned aperture 442 in an arrangement defining axis of rotation 430 about which stub axle assembly 404 rotates relative to the coupling bar 402.

Figure 19:
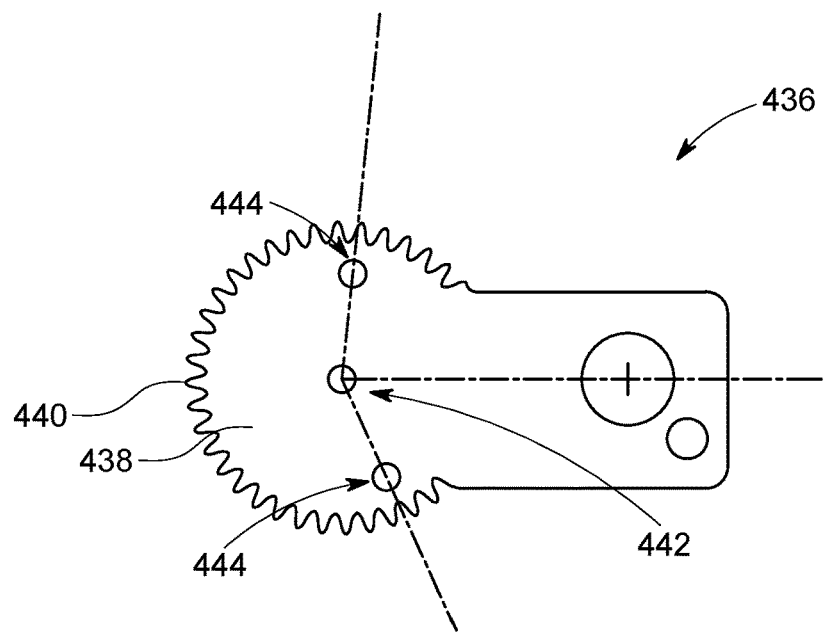
FIG. 19 shows a side view illustrating a gear plate portion of the first wheel assembly of FIG. 16.
Figure 20:
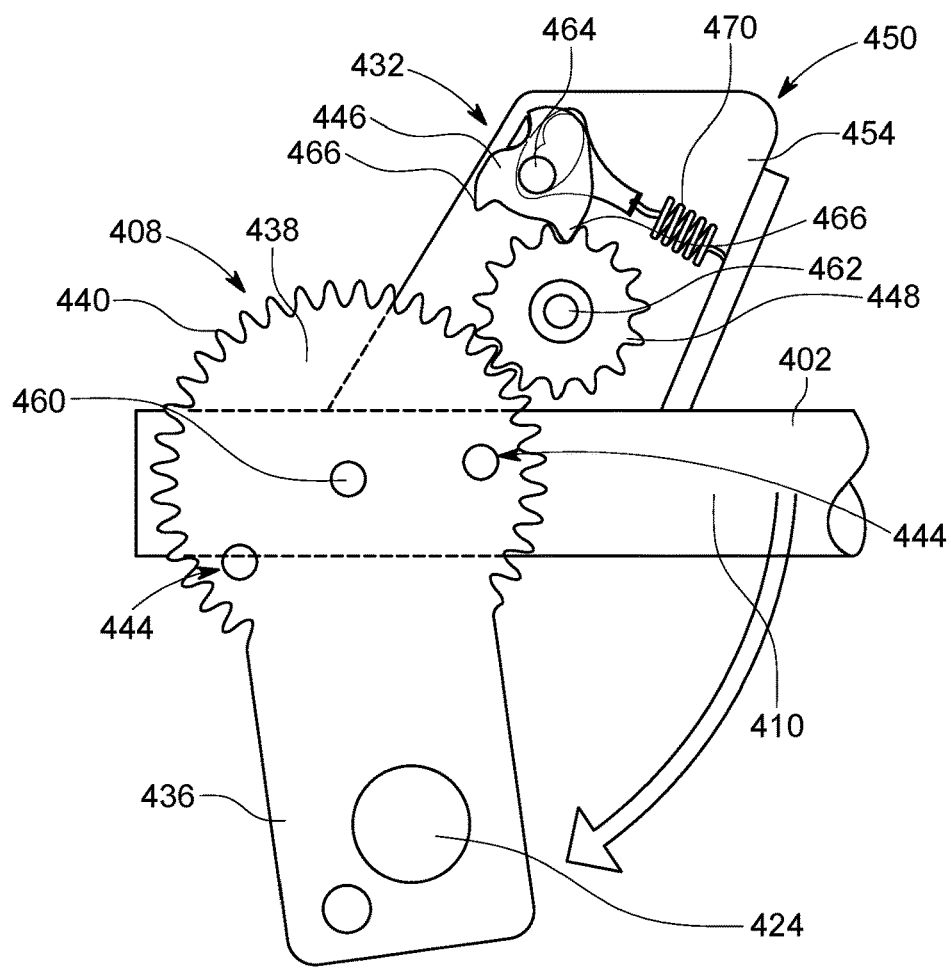
FIG. 20 is a sectional diagram illustrating the first wheel assembly of FIG. 16 adjusted to one of two height settings.

FIG. 19 is a side view illustrating gear plate portion 438 of FIG. 16. FIG. 20 and FIG. 21 are sectional diagrams of the implementation of FIG. 16. As shown in FIG. 20 and FIG. 21, ratchet mechanism 432 of the raising and lowering mechanism 408 includes a pawl 446, a pinion gear 448, and a ratchet-assembly support housing 450 rigidly fixed to the coupling bar 402. Ratchet-assembly support housing 450 includes a pair of parallel side plates 452, 454, as shown in FIG. 17. Parallel side plate 452 includes an aperture 456 that coaxially aligns with axis of rotation 430 when assembled. In addition, the side plate 452 includes a locking device in the form of a plunger pin 458 configured to selectively engage one of the two locking apertures 444 of gear plate portion 438. The side plate 452 has been omitted from sectional diagrams of FIG. 20, and FIG. 21 for clarity of description.

When assembled, the coupling bar 402 is secured between the first plate 434 and the gear plate portion 438 by a transverse pivot shaft 460 extending through centrally-positioned aperture 442 of gear plate portion 438 and the mounting aperture 445 of the first plate 434. Pivot shaft 460 also passes through the aperture 456 of the side plate 452 of the ratchet-assembly support housing 450. In such an arrangement, the pivot shaft 460 that passes through ratchet-assembly support housing 450, centrally-positioned aperture 442 of gear plate portion 438, and the frame insertion tube 402, enables stub axle assembly 404 to rotate about pivot shaft 460 (i.e., axis 430) relative to the coupling bar 402 and the ratchet-assembly support housing 450.

Pawl 446, the pinion gear 448, and the gear plate portion 438 are operably aligned within ratchet-assembly support housing 450, as best shown in FIG. 17. Pinion gear 448 is mounted on a pinion-gear axle 462 that is coupled rotationally to parallel side plates 452, 454 of ratchet-assembly support housing 450, as shown. Pinion gear 448 is arranged within ratchet-assembly support housing 450 to continuously mesh with outer set of gear teeth 440 of gear plate portion 438, as shown.

Pawl 446 is fixed on a ratchet-pawl axle 464, which is rotationally coupled to parallel side plate 452 of ratchet-assembly support housing 450, as shown. Pawl 446 includes two gear-engaging teeth 466 that alternately engage between two teeth of pinion gear 448, permitting pinion gear 448 to be rotated either clockwise or counterclockwise depending upon the engagement of pawl 446 against pinion gear 448. A spring tensioner 470 is provided to urge the pawl 446 into a position of engagement with pinion gear 448. One end of the spring tensioner 470 is engaged to pawl 446, while the other end is affixed to ratchet-assembly support housing 450, as shown. A plunger pin is used to disengage one of the two teeth of the pawl 447 to enable rotation of the pinion gear 448, and hence the gear plate portion 438 (i.e., the stub axle assembly 404 and the wheel 406 about the axis 430).

When assembled, the pivot shaft 460 defines the common axis of rotation 430, about which stub axle assembly 404 and the wheel 406 together rotate relative to the coupling bar 402. When assembled, the gear plate portion 438 may be rotated relative to ratchet-assembly support housing 450 about the pivot shaft 460 and the axis of rotation 430. As gear plate portion 438 is rotated, it will be appreciated that at least one locking aperture 444 of the gear plate portion 438 comes into alignment with plunger pin 458, which correspond to one of two height settings of the trailer 100. Plunger pin 458 may be a cam lock plunger pin (which also may be referred to as a twist lock plunger pin), as shown.

Stub axle assembly 404 may include a lever-arm receiver to allow a user to temporarily engage an elongated bar or similar lever arm to assist in manually actuating the rotate stub axle assembly 404. Lever-arm receiver may be a tubular sleeve welded to the first plate 434 facing the wheel 406.

When a user wishes to adjust the height setting of towing trailer 100, the user disengages plunger pin 458 and rotates stub axle assembly 404 along with the wheel 406 to a selected position. For rotating the stub axle assembly 404 along with the wheel 406, the user may also operate the plunger pin of the pawl 446 to disengage one of the teeth 466 of the pawl 446 from the pinion gear 448. During the rotation, the ratchet mechanism 432 limits rotational movement of the mechanism to a single direction, thus assisting the user to avoid sudden and potentially dangerous drops of the apparatus during the height adjustment. As stub axle assembly 404 nears the selected height, the plunger pin 458 aligns with a corresponding locking aperture of the pair of locking apertures 444 of gear plate portion 438. The user will then insert the plunger pin 458 inside the selected locking aperture 444. This locks the position of stub axle assembly 404 relative to ratchet-assembly support housing 450 and coupling bar 402 to prevent further relative (i.e., rotational) movement. In so rotating, the frame of the towable trailer 100 may be safely raised or lowered relative to the ground surface.

Moreover, referring to FIGS. 22 to 25, the towing trailer system 102 includes a jack assembly 500 adapted to engage with the first side frame 114 and the second side frame 116 to raise the side frames 114, 116, and hence the first wheel assembly 118 and the second wheel assembly 120 relative to the ground to facilitate the pivoting of the associated wheel 406 and the stub axle assembly 404 about respective pivot axis to raise and lower the towable trailer 100. The jack assembly 500 includes a jack 502 having an inner tube 504 and an outer tube 506 adapted to telescopically extend or retract relative to the inner tube 504. Extension and retraction mechanism may include a rack and pinion arrangement. Further, the jack 502 includes a pair of coupling plates 510, 512 engaged to the outer tube 506 and arranged spaced apart and facing each other. Each of the coupling plates 510, 512 includes a plurality of holes 514 arrayed in a direction substantially parallel to a longitudinal axis of the outer tube 506 and are aligned with a plurality of holes 514 of other of coupling plates 510, 512. This feature allows a user to adjust the height of engagement structure 530, described below, relative to jack 502. This may be needed based on the size of the towed vehicle being raised or lowered onto trailer 100.

Moreover, the jack assembly 502 includes a coupler 520 having a cylindrical body 522 and a pair of forks 524 extending longitudinally outwardly from an end of the cylindrical body 522. Each fork 524 includes at least one hole 526 to facilitate an engagement of the coupler 520 with the coupling plates 510, 512. The coupler 520 is engaged with the pair of coupling plates 510, 512 by aligning the holes 526 of the pair of forks 524 with the aligned holes 514 of the coupling plates 510, 512 and inserting at least one coupling pin 528 therethrough.

Further, the jack assembly 500 includes an engagement structure 530 that is removably coupled with the cylindrical body 522 and facilitates an engagement of the jack assembly 500 with the side frame 114, 116. The engagement structure 530 is adapted to engage with the retention structure 326 of the first side frame 114. As shown, the engagement structure 530 includes a cylindrical structure 532 and a hook plate 534 coupled to the cylindrical structure 532 and adapted to engage with the retention structure 326 of the first side frame 114. In an engagement of the engagement structure 530 with the retention structure 326, the hook plate 534 extends inside the elongated channel 332 of the retention structure 326 through the first opening 334. Moreover, the engagement structure 530 is removable coupled with the coupler 520 via at least one locking pin 540. In the engagement of the engagement structure 530 with the coupler 520, the cylindrical structure 532 is at least partially arranged inside the cylindrical body 522, and the locking pin 540 extends through the cylindrical structure 532 and the cylindrical body 522.

To raise or lower the wheels of the towable trailer, the engagement structure 530 of the jack assembly 500 is engaged with the retention structure 326 of the wheel support tube 302, as shown in FIG. 22. Subsequently, the jack 502 is operated to extend the outer tube 506 relative to the inner tube 504 to raise the wheel assembly from the ground. Thereafter, the plunger pin 458 is retracted such that the plunger pin 458 is no longer inside the locking aperture 444 of the gear plate portion 438. In this manner, the stub axle assembly 404 is free to pivot about the pivot axis 430. A user, then, rotates the stub assembly 404 and the wheel 406 together to a desired position and aligns the other of the locking apertures 444 with the plunger pin 458, and inserts the plunger pin 458 into the selected locking aperture, Subsequently, the jack 502 is retracted to position the wheel assembly 118 to the ground. Thereafter, the jack assembly 500 is disengaged from the wheel support tube 302. Similarly, the second wheel assembly is raised or lowered by using the jack assembly 500. The aforementioned jack mediated raising and lowering is useful when mounting a trike on trailer 100. Trailer 100 is lowered. Next, the trike is pushed or ridden onto trailer 100 so that the front wheel is secured with first wheel support structure 200 and the rear wheels of the trike are supported by first side frame 114 and second side frame 116. The trike can then be secured. Lastly, the trailer can be raised for towing.

The towable trailer 100 further includes a pair of wheel guards 700 adapted to cover upper portions of the two wheels 406 and engage with the side frames 114, 116 and the coupling bars 402 of the wheel assemblies 118, 120. Both the wheel guards 700 are similar in structure, construction, and assembly, and therefore, the structure and the assembly of is explained with reference to a single wheel guard. As shown in FIGS. 26 to 29, the wheel guard 700 includes a curved body 702 adapted to cover the upper portion of the wheel 406, and include a front end 704 and a rear end 706, a proximal longitudinal side 708 arranged proximate to the first side frame 114 and a distal longitudinal side 710 adapted to be arranged distally from the first side frame 114. To enable an easy engagement and removal of the wheel guard 700 with the coupling bar 402 and the first side frame 114, the wheel guard 700 includes a coupling tube 720 (shown in FIGS. 27 and 28) engaged to the curved body 702 and arranged proximate to the front end 704 of the curve body 702. The coupling tube 720 extends substantially parallel to the longitudinal sides 708, 710 of the wheel guard 700, and is arranged proximal to the proximal longitudinal side 708 of the curved body 702.

Figure 28:
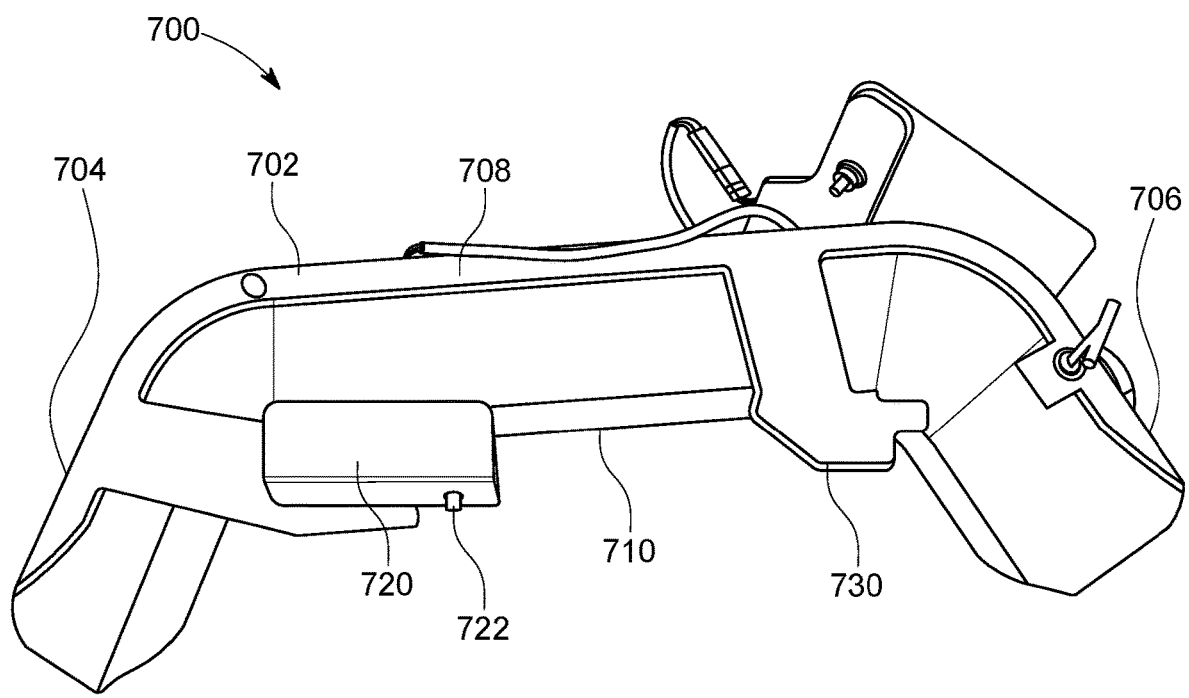
FIG. 28 shows a bottom perspective view of the wheel guard of FIG. 26.
Figure 29:
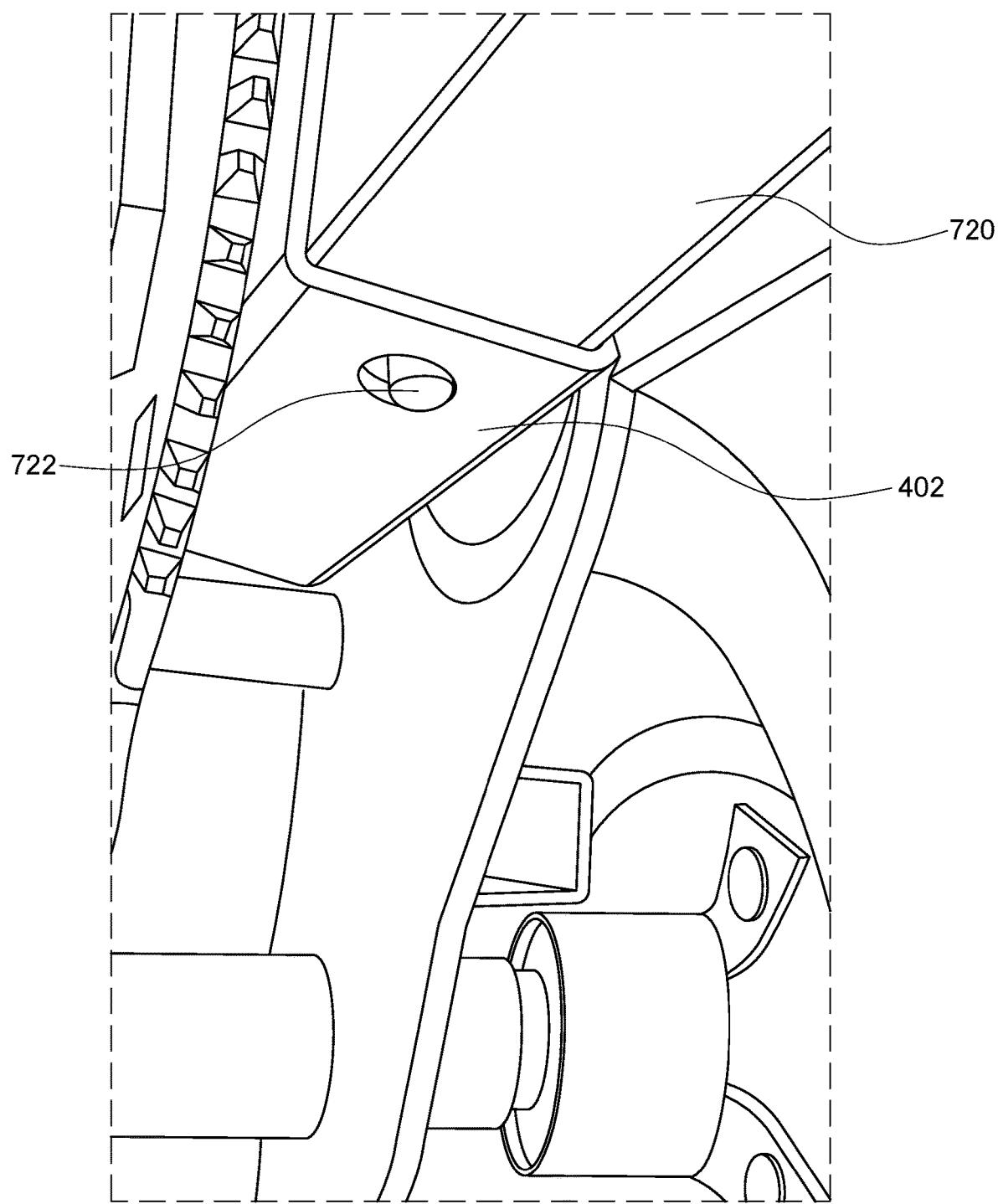
FIG. 29 shown a coupling tube of the wheel guard of FIG. 26 inserted inside a coupling of the first wheel assembly.

Further, the wheel guard 700 includes an engagement plate 730 (show in FIGS. 27 and 28) arranged proximate to the rear end 706 of the curved body 702 and disposed proximate to the proximal longitudinal side 708 of the curved body 702. In an assembly of the wheel guard 700 with the first side frame 114 and the wheel assembly 118, the coupling tube 720 extends inside the coupling bar 402 at a location proximate to the front end of the coupling bar 402, while the engagement plate 730 is retained inside the hook 342 of the first side frame 114. To secure the coupling tube 720 inside the coupling bar 402, a spring-loaded pin 722, as shown in FIG. 28 and FIG. 29, extending outwardly of a bottom surface of the coupling tube 720 extends through a hole defined at a bottom surface of the coupling bar 402 of the wheel assembly 118, and an opening defined at a bottom surface of the wheel support tube 302 of the first side frame 114. To remove the coupling tube 720 from the coupling bar 402, the pin 722 is moved upwardly, and the coupling tube 720 is pulled out of the coupling bar 402, thereby disengaging the wheel guard 700 from both the first wheel assembly 118 and the first side frame 114.

Further, the wheel guard 700 includes at least one support bracket 740 (shown in FIG. 26) extending upwardly from an upper surface 742 of the curved body 702 defining a space 744 therebetween. The support bracket 740 is arranged proximate to the rear end 706 of the curved body 702. A number plate 800 may be inserted inside the space 744, and the support bracket 740 supports/retains the number plate 800 inside the space 744. Moreover, the number plate 800 is removably engaged/attached to the wheel guard 700 by coupling a bracket 802 of the number plate 800 with a bracket 750 (best shown in FIG. 26) attached to the upper surface of the curved body 702 via a locking member 760.

Figure 30:
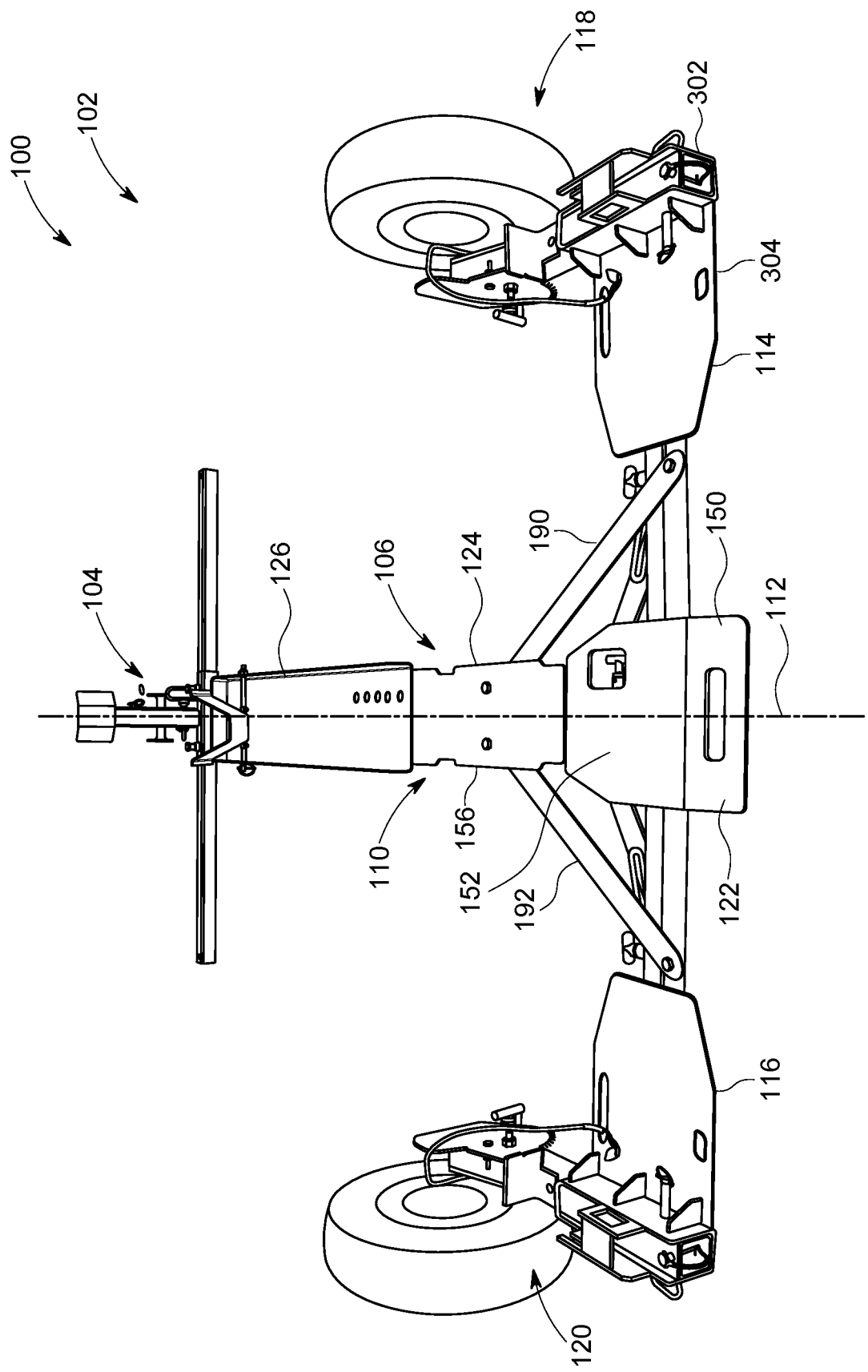
FIG. 30 shows a rear top perspective view of a towable trailer of a towable trailer system of the present disclosure.
Figure 31:
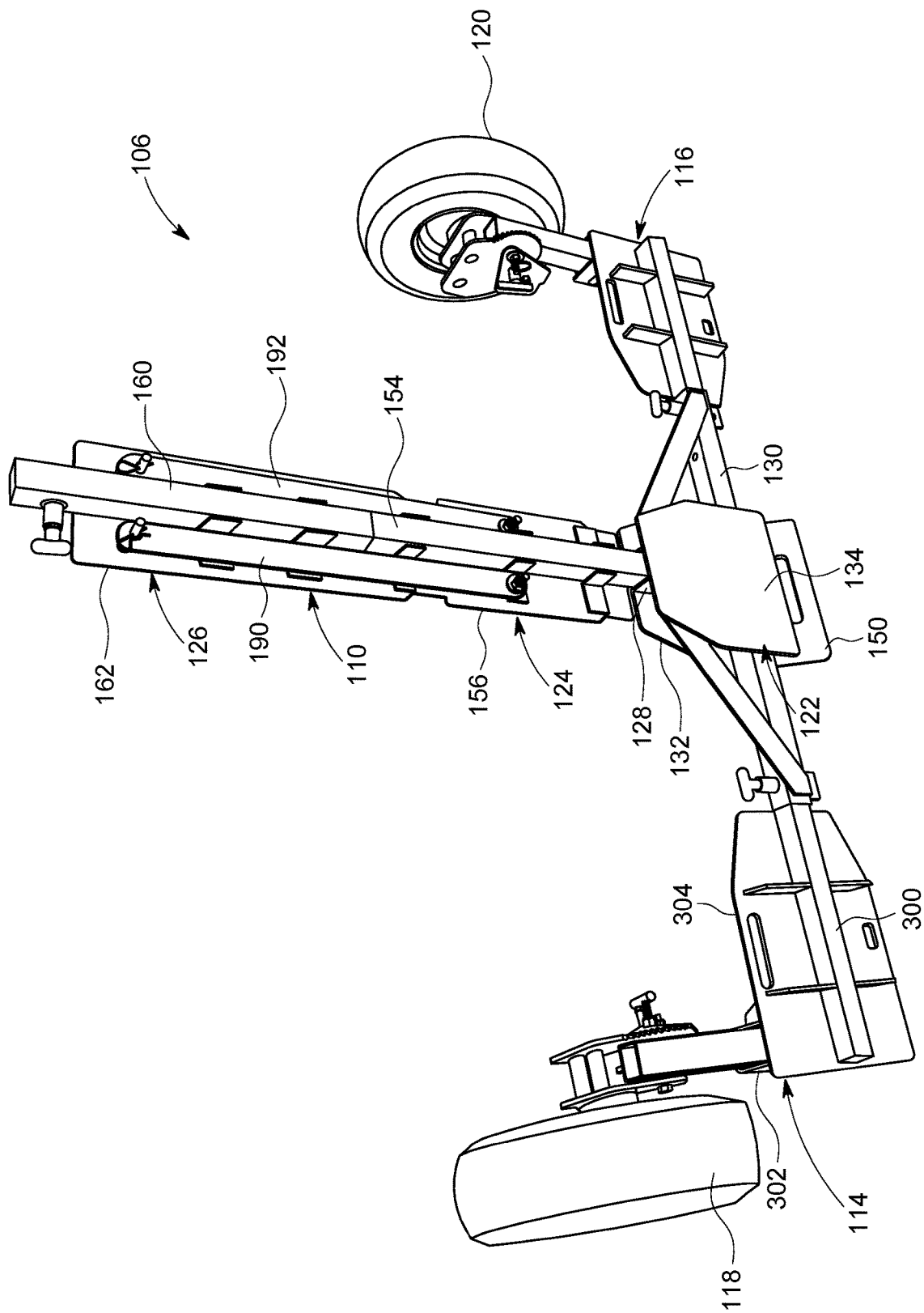
FIG. 31 shows bottom perspective view of a main body assembly of the towable trailer of FIG. 1.

FIG. 30 shows a rear top perspective view of a towable trailer of a towable trailer system of the present disclosure. FIG. 31 shows bottom perspective view of a main body assembly of the towable trailer of FIG. 1. In FIGS. 30 and 31, first wheel assembly 118 and second wheel assembly 120 are shown inserted from a front orientation.

Figure 32:
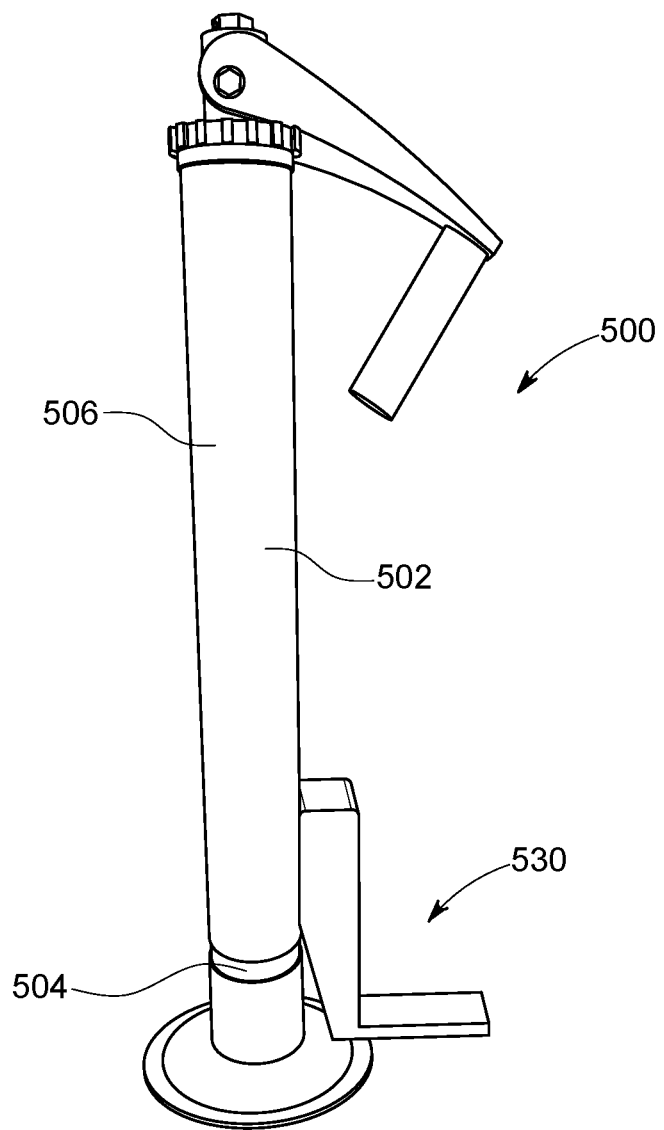
FIG. 32 shows a side perspective of an alternate implantation of the jack assembly of FIG. 22.

FIG. 32 shows a side perspective of an alternate implantation of the jack assembly of FIG. 22. In the jack assembly shown in FIG. 32, engagement structure 530 is directly welded to outer tube 506 of jack assembly 500. Engagement structure 530 shown in FIG. 32 engages the underside of first side frame 114. More specifically, engagement structure 530 engages opening 312 of tube 310 (see FIG. 14), as well as a similar structure of the opposing side of trailer 100. The jack assembly shown in FIG. 32 has advantages over the jack assembly shown in FIG. 22 in that the jack is positioned lower and can raise the trailer higher (since the jack assembly in FIG. 22 has a higher starting position).

The implementations of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is:

1. A towable trailer, comprising:
a hitch assembly having a hitch coupler adapted to be removably engaged to a towing vehicle; and
a main body assembly for supporting and carrying a motorcycle or trike and removably coupled to the hitch assembly, the main body assembly having
   a central frame extending along a central longitudinal axis of the towing trailer, the central frame including
      a first frame structure arranged at a rear end of the central frame and having a first elongate member extending in a direction of the central longitudinal axis, a first cross member arranged substantially perpendicularly to the first elongate member, and a first plate supported on the first elongate member and the first cross member and adapted to support the vehicle,
      a second frame structure telescopically and removably coupled to the first frame structure and including a support plate and a second elongate member arranged underneath the support plate and extending in a direction of the central longitudinal axis, wherein the second elongate member is removably and telescopically coupled to the first elongate member, and
      a third frame structure telescopically and removably coupled to the second frame structure and having a third elongate member telescopically coupled to the second elongate member, a tray coupled to and supported on the third elongate member, and a bracket arranged at a first end of the third frame structure and removably coupled to a connection member of the hitch assembly, and
      a wheel support structure removable coupled to the tray and arranged inside the tray and adapted to abut a wheel of the vehicle supported on the towable trailer to prevent a rearward motion of the vehicle relative to the towable trailer,
   a pair of side frames removably and telescopically coupled to the first frame structure, wherein the pair of side frames are disposed on either side of the central longitudinal axis and extend in a direction substantially perpendicular to the central longitudinal axis from the central frame, each side frame includes
      a crossbar removably and telescopically engaged with the first cross member,
      a plate supported on the crossbar,
      a wheel support tube coupled to the plate and extending in a direction substantially parallel to the central longitudinal axis, and
      an engagement bracket attached to the wheel support tube and extending upwardly from an upper surface of the wheel support tube, wherein the engagement bracket facilitates an engagement of a jack assembly with the associated side frame to facilitate a raising and lowering of the towable trailer relative to a ground surface, and
   a pair of wheel assemblies removably engaged to the pair of side frames, each wheel assembly includes
      a coupling bar removably coupled to the wheel support tube,
      a wheel,
      a stub axle assembly including
         a spindle attached to the wheel, wherein the wheel is configured to rotate about a central axis of the spindle, and
         a pair of plates extending from the spindle and pivotable coupled to the coupling bar to enable a pivoting of the stub axle assembly and the wheel relative to the coupling bar about a pivot axis to enable a raising and a lowering of the associated side frame, the pair of plates includes a second plate with a gear plate portion and defining a central mounting aperture facilitating the pivotable coupling of the stub axle assembly with the coupling bar and a pair of locking apertures arrayed around the central mounting aperture to lock a position of the stub axle assembly relative to the coupling bar, and
      a raising and lowering mechanism adapted to selectively enable the pivoting of the stub axle assembly relative to the coupling bar.

2. The towable trailer of claim 1, wherein the raising and lowering mechanism includes
a ratchet assembly support housing rigidly fixed to the coupling bar and having a side plate defining an aperture coaxially aligned with the mounting aperture of the gear plate portion and pivotally coupled to the gear plate portion,
a pinion gear rotatably mounted to the support housing and arranged in engagement to teeth of the gear plate portion,
a pawl mounted to the support housing and is engaged with pinion gear to prevent a rotation of the pinon gear, and
a plunger pin coupled to the first side plate and adapted to engage with one of the locking apertures to restrict the pivoting of the stub assembly relative to the coupling bar about the axis, wherein the plunger pin is disengaged from the locking aperture to enable the pivoting of the stub axle assembly about the axis.

3. The towable trailer of claim 1, wherein the first plate of the first frame structure includes a flat portion and an angled portion extending downwardly and rearwardly of the flat portion to facilitate a mounting of the vehicle on the towable trailer.

4. The towable trailer of claim 1, wherein the hitch assembly includes a fourth elongate member extending in a direction of the central longitudinal axis, wherein the hitch coupler is arranged at a first end of the fourth elongate member and the connection member is arranged at a second end of the fourth elongate member.

5. The towable trailer of claim 4, wherein
the hitch assembly includes an attachment bracket coupled to the fourth elongate member and arranged proximate to the connection member,
wherein the wheel support structure is a first wheel support structure, and the towable trailer includes a second wheel support structure removably connected to the attachment bracket, wherein
the second wheel support structure is adapted to receive a wheel of the vehicle arranged on the towable trailer and prevents the vehicle from moving in a forward direction.

6. The towable trailer of claim 5, wherein the second wheel support structure includes
a rod removably coupled to the attachment bracket and extending obliquely and upwardly from the fourth elongate member, and
a pair of plates extending from the rod and defining a support bracket to receive the wheel of the vehicle arranged on the towable trailer.

7. The towable trailer of claim 4, wherein the hitch assembly includes a laterally extending member arranged proximate to the connection member and coupled to the fourth elongate member, wherein the laterally extending member extends substantially perpendicularly to the central longitudinal axis and facilitates an engagement of straps to the vehicle supported on the towable trailer.

8. The towable trailer of claim 1 further including a pair of wheel guards adapted to cover upper portions of the wheels of the pair of wheel assemblies and removably engage with the pair of side frames, each wheel guard includes
a curved body adapted to cover the upper portion of the associated wheel and having a first end and a second end,
a coupling tube arranged proximate to the first end and removably coupled with the wheel support tube of the associated wheel assembly, and
an engagement plate arranged proximate to the second end and removably coupled with a hook of the associated side frame.

9. A towable trailer system, comprising:
a towable trailer including
a hitch assembly having a hitch coupler adapted to be removably engaged to a towing vehicle, and
a main body assembly for supporting and carrying a vehicle and removably coupled to the hitch assembly, the main body assembly having
a central frame extending along a central longitudinal axis of the towing trailer, the central frame including
a first frame structure arranged at a rear end of the central frame and having a first elongate member extending in a direction of the central longitudinal axis, a first cross member arranged substantially perpendicularly to the first elongate member, and a first plate supported on the first elongate member and the first cross member and adapted to support the vehicle,
a second frame structure telescopically and removably coupled to the first frame structure and including a support plate and a second elongate member arranged underneath the support plate and extending in a direction of the central longitudinal axis, wherein the second elongate member is removably and telescopically coupled to the first elongate member, and
a third frame structure telescopically and removably coupled to the second frame structure and having a third elongate member telescopically coupled to the second elongate member, a tray coupled to and supported on the third elongate member, and a bracket arranged at a first end of the third frame structure and removably coupled to a connection member of the hitch assembly, and
a wheel support structure removable coupled to the tray and arranged inside the tray and adapted to abut a wheel of the vehicle supported on the towable trailer to prevent a rearward motion of the vehicle relative to the towable trailer,
a pair side frames removably and telescopically coupled to the first frame structure, wherein the pair of side frames are disposed on either side of the central longitudinal axis and extend in a direction substantially perpendicular to the central longitudinal axis from the central frame, each side frame includes
a crossbar removably and telescopically engaged with the first cross member,
a plate supported on the crossbar,
a wheel support tube coupled to the plate and extending in a direction substantially parallel to the central longitudinal axis, and
an engagement bracket attached to the wheel support tube and extending upwardly from an upper surface of the wheel support tube, and
a pair of wheel assemblies removably engaged to the pair of side frames, each wheel assembly includes
a coupling bar removably coupled to the wheel support tube,
a wheel,
a stub axle assembly including
a spindle attached to the wheel, wherein the wheel is configured to rotate about a central axis of the spindle, and
a pair of plates extending from the spindle and pivotable coupled to the coupling bar to enable a pivoting of the stub axle assembly and the wheel relative to the coupling bar about a pivot axis to enable a raising and a lowering of the associated side frame, the pair of plates includes a second plate with a gear plate portion and defining a central mounting aperture facilitating the pivotable coupling of the stub axle assembly with the coupling bar and a pair of locking apertures arrayed around the central mounting aperture to lock a position of the stub axle assembly relative to the coupling bar, and
a raising and lowering mechanism adapted to selectively enable the pivoting of the stub axle assembly relative to the coupling bar; and
a jack assembly having a jack and an engagement structure removably coupled to the jack and adapted to engage with the engagement bracket of the associated side frame to facilitate a raising of the side frame relative to a ground surface to enable the pivoting of the associated wheel and the stub axle assembly relative to the coupling bar about the axis.

10. The towable trailer system of claim 9, wherein the jack includes
an inner tube,
an outer tube adapted to telescopically extend and retract relative to the inner tube, and
a pair of coupling plates coupled to the outer tube and arranged spaced apart from each other, each coupling plate includes a vertical array of holes to facilitate the removable coupling of the engagement structure with the jack.

11. The towable trailer system of claim 10, wherein the engagement structure includes
a cylindrical structure adapted to be removably coupled to the coupling plates, and
a hook plate coupled to the cylindrical structure and adapted to engage with the engagement bracket of the side frame.

12. The towable trailer system of claim 11, wherein the engagement bracket of the side frame defines an elongated channel and the hook plate is configured to extend inside the elongated channel of the engagement bracket.

13. The towable trailer system of claim 11, wherein the jack assembly includes a coupler for removably coupling the jack with the engagement structure, wherein the coupler includes
a cylindrical body adapted to be removably coupled with the cylindrical structure of the engagement structure, and
a pair of forks extending outwardly from an end of the cylindrical body, each fork includes at least one hole to facilitate the removable engagement of the coupler with the coupling plates of the jack.

14. The towable trailer system of claim 9, wherein the raising and lowering mechanism includes
a ratchet assembly support housing rigidly fixed to the coupling bar and having a side plate defining an aperture coaxially aligned with the mounting aperture of the gear plate portion and pivotally coupled to the gear plate portion,
a pinion gear rotatably mounted to the support housing and arranged in engagement to teeth of the gear plate portion,
a pawl mounted to the support housing and is selectively engaged with pinion gear to prevent a rotation of the pinon gear, and
a plunger pin coupled to the first side plate and adapted to engage with one of the locking apertures to restrict the pivoting of the stub assembly relative to the coupling bar about the axis, wherein the plunger pin is disengaged from the locking aperture to enable the pivoting of the stub axle assembly about the axis.

15. The towable trailer system of claim 9, wherein the first plate of the first frame structure includes a flat portion and an angled portion extending downwardly and rearwardly of the flat portion to facilitate a mounting of the vehicle on the towable trailer.

16. The towable trailer system of claim 9, wherein the hitch assembly includes a fourth elongate member extending in a direction of the central longitudinal axis, wherein the hitch coupler is arranged at a first end of the fourth elongate member and the connection member is arranged at a second end of the fourth elongate member.

17. The towable trailer system of claim 16, wherein
the hitch assembly includes an attachment bracket coupled to the fourth elongate member and arranged proximate to the connection member,
wherein the wheel support structure is a first wheel support structure, and the towable trailer includes a second wheel support structure removably connected to the attachment bracket, wherein
the second wheel support structure is adapted to receive a wheel of the vehicle arranged on the towable trailer and prevents the vehicle from moving in a forward direction.

18. The towable trailer system of claim 17, wherein the second wheel support structure includes
a rod removably coupled to the attachment bracket and extending obliquely and upwardly from the fourth elongate member, and
a pair of plates extending from the rod and defining a support bracket to receive the wheel of the vehicle arranged on the towable trailer.

19. The towable trailer system of claim 17, wherein the hitch assembly includes a laterally extending member arranged proximate to the connection member and coupled to the fourth elongate member, wherein the laterally extending member extends substantially perpendicularly to the central longitudinal axis and facilitates an engagement of straps to the vehicle supported on the towable trailer.

20. The towable trailer system of claim 9 further including a pair of wheel guards adapted to cover upper portions of the wheels of the pair of wheel assemblies and removably engage with the pair of side frames, each wheel guard includes
a curved body adapted to cover the upper portion of the associated wheel and having a first end and a second end,
a coupling tube arranged proximate to the first end and removably coupled with the wheel support tube of the associated wheel assembly, and
an engagement plate arranged proximate to the second end and removably coupled with a hook of the associated side frame.

* * * * *